(12) United States Patent
Basilion

(10) Patent No.: US 12,521,435 B2
(45) Date of Patent: *Jan. 13, 2026

(54) PHOTODYNAMIC THERAPY COMPOSITION

(71) Applicant: CASE WESTERN RESERVE UNIVERSITY, Cleveland, OH (US)

(72) Inventor: James Basilion, Shaker Heights, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 385 days.

This patent is subject to a terminal disclaimer.

(21) Appl. No.: 17/368,574

(22) Filed: Jul. 6, 2021

(65) Prior Publication Data

US 2022/0001011 A1    Jan. 6, 2022

Related U.S. Application Data

(60) Provisional application No. 63/047,954, filed on Jul. 3, 2020.

(51) Int. Cl.
| | | |
|---|---|---|
| *A61K 41/00* | (2020.01) | |
| *A61K 47/60* | (2017.01) | |
| *A61K 47/65* | (2017.01) | |
| *A61K 47/69* | (2017.01) | |
| *B82Y 5/00* | (2011.01) | |

(52) U.S. Cl.
CPC .......... *A61K 41/0057* (2013.01); *A61K 47/60* (2017.08); *A61K 47/65* (2017.08); *A61K 47/6929* (2017.08); *B82Y 5/00* (2013.01)

(58) Field of Classification Search
CPC ............ A61K 41/0071; A61K 47/6923; A61K 41/0057; B82Y 5/00
See application file for complete search history.

(56) References Cited

U.S. PATENT DOCUMENTS

| | | | |
|---|---|---|---|
| 6,217,869 B1 | 4/2001 | Meyer et al. | |
| 8,252,740 B2 * | 8/2012 | Raucher ............... | A61K 47/645 514/1.2 |
| 9,439,966 B2 | 9/2016 | Karathanasis et al. | |
| 9,889,199 B2 | 2/2018 | Basilion et al. | |
| 10,207,005 B2 | 2/2019 | Basilion et al. | |
| 10,363,313 B2 | 7/2019 | Basilion et al. | |
| 10,709,794 B2 | 7/2020 | Basilion et al. | |
| 2002/0010351 A1 | 1/2002 | Serhan | |
| 2002/0103517 A1 | 8/2002 | West et al. | |
| 2002/0122806 A1 | 9/2002 | Chinnaiyan et al. | |
| 2003/0044805 A1 | 3/2003 | Mirkin et al. | |
| 2004/0077844 A1 | 4/2004 | Jacobson et al. | |
| 2005/0273143 A1 | 12/2005 | Kanzius et al. | |
| 2006/0083781 A1 | 4/2006 | Shastri et al. | |
| 2006/0088475 A1 | 4/2006 | Duimstra et al. | |
| 2006/0233712 A1 | 10/2006 | Penades et al. | |
| 2008/0193381 A1 | 8/2008 | Babich et al. | |
| 2009/0061010 A1 | 3/2009 | Zale et al. | |
| 2009/0181101 A1 | 7/2009 | Rademacher et al. | |
| 2009/0221764 A1 | 9/2009 | Shumaker-Parry et al. | |
| 2010/0324008 A1 | 12/2010 | Low et al. | |
| 2012/0323164 A1 | 12/2012 | Kenney et al. | |
| 2015/0366968 A1 | 12/2015 | Basilion et al. | |

FOREIGN PATENT DOCUMENTS

| | | |
|---|---|---|
| WO | 2004/037975 A2 | 5/2004 |
| WO | 2005/055982 A2 | 6/2005 |
| WO | 2005/099693 A2 | 10/2005 |
| WO | 2008/019052 A2 | 2/2008 |
| WO | 2008057437 A1 | 5/2008 |
| WO | 2011106639 A1 | 9/2011 |
| WO | 2012016713 A2 | 2/2012 |
| WO | 2014127365 A1 | 8/2014 |

OTHER PUBLICATIONS

Stuchinskaya et al. "Targeted photodynamic therapy of breast cancer cells using antibody-phthalocyanine-gold nanoparticle conjugates" Photochem. Photobiol. Sci., 2011, 10, 822-831 (Year: 2011).*

Weider et al. "Intracellular photodynamic therapy with photosensitizer-nanoparticleconjugates: cancer therapy using a 'Trojan horse'", Photochem. Photobiol. Sci., 2006, 5, 727-734 (Year: 2006).*

Applicant: Case Western Reserve University; PCT International Application No. PCT/US2020/014460; Filed Jan. 21, 2020; PCT International Search Report dated Apr. 6, 2020; 2 pgs.

Bonnet et al., AJNR Am. J. Neuroradiol., 2010, vol. 31, pp. 401-409.

Duimstra et al., J. Am. Chem. Soc., vol. 127, pp. 12847-12855 (Year: 2005).

EP Office action for Application No. 14751113.3-1109, dated Jan. 1, 2019.

Extended Search Report for Application No. 14751113.3-1453/2958596, dated Oct. 10, 2016.

Ikeda, Masato, et al, "Supramolecular hydrogel capsule showing prostate specific antigent-responsive function for ensing and targeting prostate cancer cells"; Chem. Sci., 2010, 1, 491-498.

Kularatne, Sumith A., et al., "Synthesis and Biological Analysis of Prostate-Specific Membrane Antigen-Targeted Anticancer Prodrugs"; Journal of Medicinal Chemistry, vol. 53, No. 21, Nov. 11, 2010, pp. 7767-7777, KP055103918.

(Continued)

*Primary Examiner* — James W Rogers

(74) *Attorney, Agent, or Firm* — Tarolli, Sundheim, Covell & Tummino LLP

(57) ABSTRACT

A photodynamic therapy composition, the composition includes a plurality of targeted phthalocyanine gold nanoparticle conjugates, wherein each targeted phthalocyanine gold nanoparticle conjugate includes a plurality of phthalocyanine compounds covalently coupled to a surface of the gold nanoparticle via bio-cleavable linker and a plurality of cancer or tissue targeting agents coupled to the gold nanoparticle.

18 Claims, 11 Drawing Sheets

Specification includes a Sequence Listing.

(56) References Cited

OTHER PUBLICATIONS

Major et al, Acc. Chem. Res., 2009, vol. 42, No. 7, pp. 893-903.
Pedley et al., Methods in Molecular Science, 2004, vol. 90, pp. 491-514.
Urbanczyk-Pearson et al, Nature Protocols, vol. 3, No. 3, pp. 341-350 (Year: 2008).
Applicant: Case Western Reserve University; PCT International Application No. PCT/US2019/23901; Filed Mar. 25, 2019; PCT International Search Report dated Jul. 3, 2019; 8 pgs.
U.S. Appl. No. 16/573,570, filed Sep. 17, 2019, U.S. Non-Final Rejection dated Jun. 10, 2022, 24 pgs.
U.S. Appl. No. 16/901,874, filed Jun. 15, 2020, U.S. Non-Final Rejection dated Aug. 18, 2022, 13 pgs.

\* cited by examiner

| Core size | Shell thickness | Hydrodynamic size (HD) | Number of Pc158 per NP |
|---|---|---|---|
| 5 nm | 10.2 nm | 24.5 nm | 11 |

```
                       SEQUENCE LISTING

<160> NUMBER OF SEQ ID NOS: 1

<210> SEQ ID NO 1
<211> LENGTH: 5
<212> TYPE: PRT
<213> ORGANISM: Artificial Sequence
<220> FEATURE:
<223> OTHER INFORMATION: Synthetic Construct

<400> SEQUENCE: 1

Gly Phe Leu Gly Cys
1               5
```

PHOTODYNAMIC THERAPY COMPOSITION

RELATED APPLICATION

This application claims priority from U.S. Provisional Application No. 63/047,594, filed Jul. 3, 2020, the subject matter of which are incorporated herein by reference in their entirety.

GOVERNMENT FUNDING

This invention was made with government support under EB012099 awarded by the National Institutes of Health. The government has certain rights in the invention.

TECHNICAL FIELD

This application relates to diagnostic and therapeutic compounds and compositions, and more particularly relates to compounds and compositions for use in photodynamic therapy.

BACKGROUND

Photodynamic therapy, hereinafter also referred to as "PDT", is a process for treating cancer wherein visible light is used to activate a substance, such as a dye or drug, which then attacks the tumor tissue through one or more photochemical reactions, thereby producing a cell-killing, or cytotoxic, effect. When certain photosensitizer compounds are applied to a human or animal body, they are selectively retained by cancerous tissue while being eliminated by healthy tissue. The tumor or cancerous tissue containing the photosensitizer can then be exposed to therapeutic light of an appropriate wavelength and at a specific intensity for activation. The light energy and the photosensitizer cause a photochemical reaction which kills the cells in which the photosensitizer resides.

Phthalocyanines, hereinafter also abbreviated as "Pcs", are a group of photosensitizer compounds having the phthalocyanine ring system. Phthalocyanines are azaporphyrins consisting of four benzoindole groups connected by nitrogen bridges in a 16-membered ring of alternating carbon and nitrogen atoms (i.e., $C_{32}H_{16}N_8$) which form stable chelates with metal and metalloid cations. In these compounds, the ring center is occupied by a metal ion (either a diamagnetic or a paramagnetic ion) that may, depending on the ion, carry one or two ligands. In addition, the ring periphery may be either unsubstituted or substituted. The synthesis and use of a wide variety of phthalocyanines in photodynamic therapy is described in International Publication WO 2005/099689. Phthalocyanines strongly absorb clinically useful red or near IR radiation with absorption peaks falling between about 600 and 810 nm, which potentially allows deep tissue penetration by the light.

SUMMARY

Embodiments described herein relate to a photodynamic therapy composition its use in diagnostic, therapeutic, and theranostic applications and particularly for use in photodynamic therapy (PDT). The photodynamic therapy composition includes a plurality of targeted phthalocyanine gold nanoparticle conjugates. Each targeted phthalocyanine gold nanoparticle conjugate includes a plurality of phthalocyanine compounds covalently coupled to a surface of the gold nanoparticle via bio-cleavable linkers and a plurality of cancer or tissue targeting moieties coupled to the gold nanoparticle for targeting the conjugate to a tissue or cancer cell.

In some embodiments, the phthalocyanine compound prior to covalent coupling to the surface of the gold nanoparticle with the bio-cleavable linker can have the formula (I):

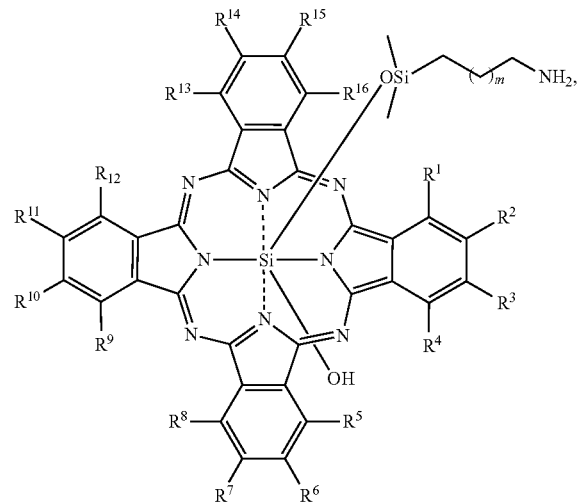

wherein m is 1-5;

$R^1$, $R^4$, $R^5$, $R^8$, $R^9$, $R^{12}$, $R^{13}$, and $R^{16}$ are each independently selected from the group consisting of hydrogen, halogen, nitro, cyano, hydroxyl, thiol, amino, and methyl;

$R^2$, $R^3$, $R^6$, $R^7$, $R^{10}$, $R^{11}$, $R^{14}$, and $R^{15}$ are each independently selected from the group consisting of hydrogen, halogen, nitro, cyano, hydroxyl, thiol, amino, carboxy, aryl, heteroaryl, carbocyclyl, heterocyclyl, $C_{1-6}$ alkyl, $C_{1-6}$ alkenyl, $C_{1-6}$ alkynyl, $C_{1-6}$ alkoxy, $C_{1-6}$ acyl, $C_{1-6}$ alkylcarbonyloxy, $C_{1-6}$ carbocyclylalkyl, $C_{1-6}$ aminoalkyl, $C_{1-6}$ alkylamino, $C_{1-6}$ thioalkyl, $C_{1-6}$alkylthio, $C_{1-6}$hydroxyalkyl, $C_{1-6}$ alkyloxycarbonyl, $C_{1-6}$ alkylaminocarbonyl, and $C_{1-6}$ alkylcarbonylamino; and pharmaceutically acceptable salts thereof.

In some embodiments, $R^1$-$R^{16}$ of the phthalocyanine compound are independently selected from hydrogen, halogen, nitro, cyano, hydroxyl, thiol, amino, and methyl.

In some embodiments, the phthalocyanine compound can have the formula (II):

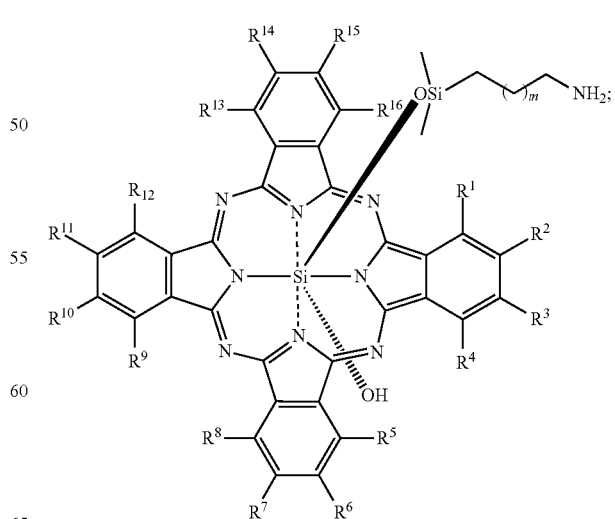

wherein m is 1-5;

$R^1$, $R^4$, $R^5$, $R^8$, $R^9$, $R^{12}$, $R^{13}$, and $R^{16}$ are each independently selected from the group consisting of hydrogen, halogen, nitro, cyano, hydroxyl, thiol, amino, and methyl;

$R^2$, $R^3$, $R^6$, $R^7$, $R^{10}$, $R^{11}$, $R^{14}$, and $R^{15}$ are each independently selected from the group consisting of hydrogen, halogen, nitro, cyano, hydroxyl, thiol, amino, carboxy, aryl, heteroaryl, carbocyclyl, heterocyclyl, $C_{1-6}$ alkyl, $C_{1-6}$ alkenyl, $C_{1-6}$ alkynyl, $C_{1-6}$ alkoxy, $C_{1-6}$ acyl, $C_{1-6}$ alkylcarbonyloxy, $C_{1-6}$ carbocyclylalkyl, $C_{1-6}$ aminoalkyl, $C_{1-6}$ alkylamino, $C_{1-6}$ thioalkyl, $C_{1-6}$ alkylthio, $C_{1-6}$ hydroxyalkyl, $C_{1-6}$ alkyloxycarbonyl, $C_{1-6}$ alkylaminocarbonyl, and $C_{1-6}$ alkylcarbonylamino; and pharmaceutically acceptable salts thereof. In some embodiments, $R^1$-$R^{16}$ of the phthalocyanine compound are independently selected from hydrogen, halogen, nitro, cyano, hydroxyl, thiol, amino, and methyl.

In some embodiments, the phthalocyanine compound can have the formula (III):

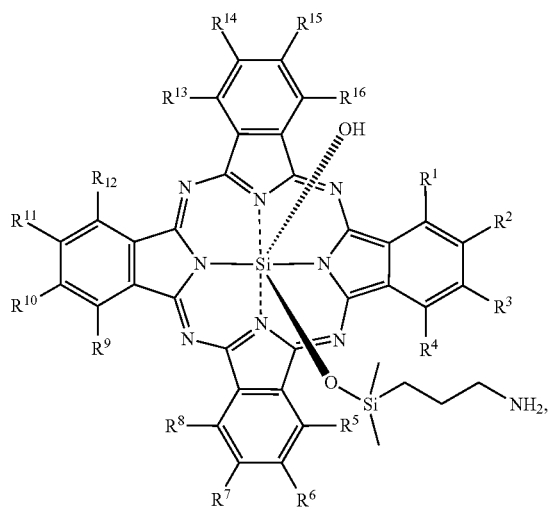

wherein m is 1-5;

$R^1$, $R^4$, $R^5$, $R^8$, $R^9$, $R^{12}$, $R^{13}$, and $R^{16}$ are each independently selected from the group consisting of hydrogen, halogen, nitro, cyano, hydroxyl, thiol, amino, and methyl;

$R^2$, $R^3$, $R^6$, $R^7$, $R^{10}$, $R^{11}$, $R^{14}$, and $R^{16}$ are each independently selected from the group consisting of hydrogen, halogen, nitro, cyano, hydroxyl, thiol, amino, carboxy, aryl, heteroaryl, carbocyclyl, heterocyclyl, $C_{1-6}$ alkyl, $C_{1-6}$ alkenyl, $C_{1-6}$ alkynyl, $C_{1-6}$ alkoxy, $C_{1-6}$ acyl, $C_{1-6}$ alkylcarbonyloxy, $C_{1-6}$ carbocyclylalkyl, $C_{1-6}$ aminoalkyl, $C_{1-6}$ alkylamino, $C_{1-6}$ thioalkyl, $C_{1-6}$alkylthio, $C_{1-6}$hydroxyalkyl, $C_{1-6}$ alkyloxycarbonyl, $C_{1-6}$ alkylaminocarbonyl, and $C_{1-6}$ alkylcarbonylamino; and pharmaceutically acceptable salts thereof. In some embodiments, $R^1$-$R^{16}$ of the phthalocyanine compound are independently selected from hydrogen, halogen, nitro, cyano, hydroxyl, thiol, amino, and methyl.

In some embodiments, the phthalocyanine compound can have the formula (IV):

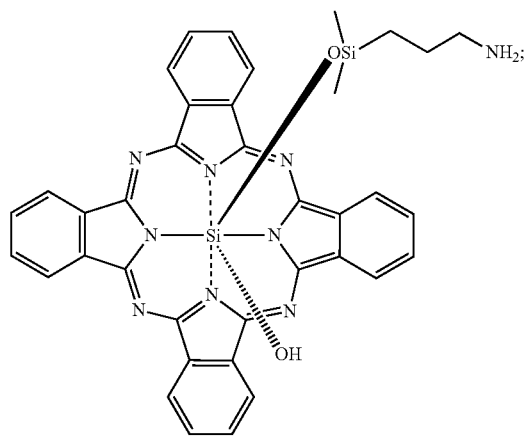

and pharmaceutically acceptable salts thereof.

In some embodiments, the bio-compatible linker can include a lysosomal cleavable peptide having the amino acid sequence of GFLGC (SEQ ID NO:1). The PEGylated gold nanoparticle can be directly conjugated to the cysteine residue of the bio-cleavable linker via an Au—S bond.

In some embodiments, the plurality of cancer or tissue targeting agents coupled to the gold nanoparticle can include at least one PSMA ligand coupled to polyethylene glycol of the gold nanoparticle for targeting the composition to a PSMA expressing cancer cell. In some embodiments, the PAMA ligand can include a PSMA-1 ligand.

In some embodiments, the photodynamic therapy composition is formulated for systemic administration.

Other embodiments described herein relate to a method for treating a PSMA expressing cancer. The method includes administering systemically to a subject with PSMA expressing cancer a therapeutically effective amount of a photodynamic therapy composition, the photodynamic therapy composition including a plurality of targeted phthalocyanine gold nanoparticle conjugates, wherein each targeted phthalocyanine gold nanoparticle conjugate includes a plurality of phthalocyanine compounds covalently coupled to a surface of the gold nanoparticle via bio-cleavable linker and a plurality of cancer or tissue targeting agents coupled to the gold nanoparticle. The method also includes exposing the phthalocyanine compounds to near infrared (NIR) light, thereby inducing the cytotoxic effects of the phthalocyanine compound.

In some embodiments, the phthalocyanine compounds are exposed to NIR light after being enzymatically cleaved from the targeted phthalocyanine gold nanoparticle conjugates in an endolysosomal vesicle of a targeted cancer cell, wherein the conjugated phthalocyanine compounds are inactive prior to cleavage from the targeted gold nanoparticle.

The bio-cleavable linker can include a lysosomal cleavable peptide having the amino acid sequence GFLGC (SEQ ID NO:1). The PEGylated gold nanoparticle can be directly conjugated to the cysteine residue of the bio-cleavable linker via an Au—S bond.

In some embodiments the composition is administered by intravenous injection. The PSMA expressing cancer can be selected from the group consisting of renal carcinoma, transitional cell carcinoma of the urinary bladder, testicular embryonal carcinoma, colonic adenocarcinoma, neuroendocrine carcinoma, glioblastoma multiforme, malignant melanoma, pancreatic ductal carcinoma, non-small cell lung carcinoma, soft tissue carcinoma, breast carcinoma, and prostatic adenocarcinoma. In some embodiments, the PSMA expressing cancer is metastatic prostate cancer.

In some embodiments, the step of exposing at least one of the phthalocyanine compounds to near infrared (NIR) light can include administering to the subject at least one therapeutically effective amount of NIR light following administration of the photodynamic therapy composition to the subject. In some embodiments, the NIR light can be administered between about 6 to about 24 hours after the photodynamic therapy composition is administered to the subject. In some embodiments, the NIR light is sequentially administered at least three times following administration of the photodynamic therapy composition to the subject, and each NIR administration results in increased photodynamic therapy composition in the subject's cancer cells. In some embodiments, the NIR light is first administered between about 6 hours to about 24 hours after the photodynamic therapy composition is administered to the subject, and each subsequent NIR light administration is about 24 hours after the previous administration.

Additional embodiments described herein relate to a method for treating a PSMA expressing cancer. The method includes administering systemically to a subject with PSMA expressing cancer a therapeutically effective amount of a photodynamic therapy composition described herein. The method also includes exposing the phthalocyanine compound to near infrared (NIR) light, thereby inducing the cytotoxic effects of the phthalocyanine compound, wherein NIR light is sequentially administered at least three times following administration of the photodynamic therapy composition to the subject, and wherein each NIR administration results in increased photodynamic therapy composition accumulation in the subject's cancer cells. In some embodiments, the PSMA expressing cancer is PSMA expressing metastatic prostate cancer.

In some embodiments, the NIR light is first administered between about 6 to about 24 hours after the photodynamic therapy composition is administered to the subject, and each subsequent NIR light administration is about 24 hours after the previous administration.

In some embodiments, the phthalocyanine compounds are exposed to NIR light after being enzymatically cleaved from the targeted phthalocyanine gold nanoparticle conjugates in an endolysosomal vesicle of a targeted cancer cell, wherein the conjugated phthalocyanine compounds are inactive prior to cleavage from the targeted gold nanoparticle.

BRIEF DESCRIPTION OF THE DRAWINGS

The following is a brief description of the drawings which are presented for the purpose of illustrating the invention and not for the purpose of limiting them.

DETAILED DESCRIPTION

Figures 1A, 1B:
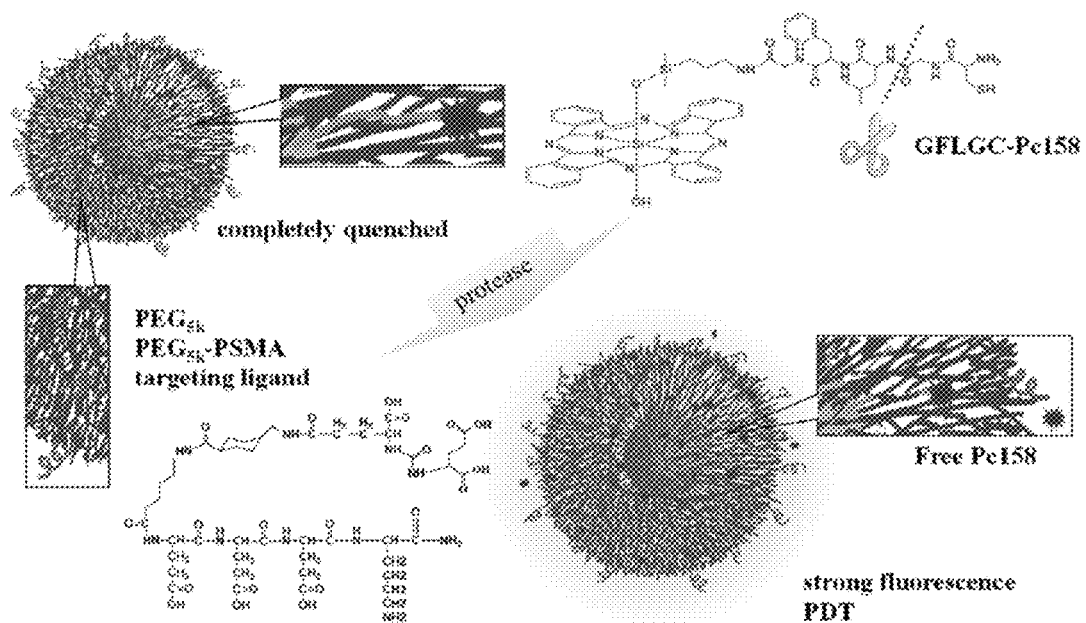
FIGS. 1(A-B) illustrate activatable AuNPs-Pc158 conjugates for selective photodynamic therapy. (A) Schematic representation of PSMA-targeted AuNPs-Pc158 conjugates with AuNP core as quencher. Activation occurs with cathepsin, which cleaves the GLFGC linker, releasing Pc158 for PDT. (B) Table shows the size of nanoparticles and Pc158 loading.

All scientific and technical terms used in this application have meanings commonly used in the art unless otherwise specified. The definitions provided herein are to facilitate understanding of certain terms used frequently herein and are not meant to limit the scope of the application.

The term "alkoxy" refers to an alkyl group having an oxygen attached thereto. Representative alkoxy groups include methoxy, ethoxy, propoxy, tert-butoxy and the like. An "ether" is two hydrocarbon groups covalently linked by an oxygen. Accordingly, the substituent of an alkyl that renders that alkyl an ether is or resembles an alkoxy.

The terms "amine" and "amino" are art-recognized and refer to both unsubstituted and substituted amines and salts thereof.

The term "aryl" as used herein includes 5-, 6-, and 7-membered substituted or unsubstituted single-ring aromatic groups in which each atom of the ring is carbon. Aryl groups include benzene, phenol, aniline, and the like.

The terms "carbocycle" and "carbocyclyl", as used herein, refer to a non-aromatic substituted or unsubstituted ring in which each atom of the ring is carbon.

The terms "heteroaryl" includes substituted or unsubstituted aromatic 5- to 7-membered ring structures, more preferably 5- to 6-membered rings, whose ring structures include one to four heteroatoms. Heteroaryl groups include, for example, pyrrole, furan, thiophene, imidazole, oxazole, thiazole, triazole, pyrazole, pyridine, pyrazine, pyridazine and pyrimidine, and the like.

The term "heteroatom" as used herein means an atom of any element other than carbon or hydrogen. Preferred heteroatoms are nitrogen, oxygen, phosphorus, and sulfur.

The terms "heterocyclyl" or "heterocyclic group" refer to substituted or unsubstituted non-aromatic 3- to 10-membered ring structures, more preferably 3- to 7-membered rings, whose ring structures include one to four heteroatoms.

The term "substituted" refers to moieties having substituents replacing a hydrogen on one or more carbons of the framework. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate.

Substituents on fused ring structures can be peripheral or non-peripheral substituents. A non-peripheral substituent, as defined herein, is a substituent which is adjacent (i.e., a) to the point of fusion between an outer phenyl ring and an inner pyrrole ring, as found in phthalocyanine compounds as exemplified by Formula (I) herein. A substituent is peripheral, on the other hand, when it is not a non-peripheral substituent. For example, in Formula I provided herein, the substituents $R^2$, $R^3$, $R^6$, $R^7$, $R^{10}$, $R^{11}$, $R^{14}$, and $R^{15}$ are peripheral substituents.

As used herein, the term "targeting moiety" can refer to a molecule or molecules that are able to bind to and complex with a biomarker. The term can also refer to a functional group that serves to target or direct a compound described herein to a particular location, cell type, diseased tissue, or association. In general, a "targeting moiety" can be directed against a biomarker.

As used herein, the term "molecular signature" can refer to a unique expression pattern of one or more biomarkers (e.g., gene(s) or protein(s)) of a cell.

As used herein, the term "neoplastic disorder" can refer to a disease state in a subject in which there are cells and/or tissues which proliferate abnormally. Neoplastic disorders can include, but are not limited to, cancers, sarcomas, tumors, leukemias, lymphomas, and the like.

As used herein, the term "neoplastic cell" can refer to a cell that shows aberrant cell growth, such as increased, uncontrolled cell growth. A neoplastic cell can be a hyperplastic cell, a cell from a cell line that shows a lack of contact inhibition when grown in vitro, a tumor cell, or a cancer cell that is capable of metastasis in vivo. Alternatively, a neoplastic cell can be termed a "cancer cell." Non-limiting examples of cancer cells can include melanoma, breast cancer, ovarian cancer, prostate cancer, sarcoma, leukemic retinoblastoma, hepatoma, myeloma, glioma, mesothelioma, carcinoma, leukemia, lymphoma, Hodgkin lymphoma, Non-Hodgkin lymphoma, promyelocytic leukemia, lymphoblastoma, thymoma, lymphoma cells, melanoma cells, sarcoma cells, leukemia cells, retinoblastoma cells, hepatoma cells, myeloma cells, glioma cells, mesothelioma cells, and carcinoma cells.

As used herein, the term "tumor" can refer to an abnormal mass or population of cells that result from excessive cell division, whether malignant or benign, and all pre-cancerous and cancerous cells and tissues.

A "therapeutically effective amount" of a compound with respect to the subject method of treatment, refers to an amount of the compound(s) in a preparation which, when administered as part of a desired dosage regimen (to a mammal, preferably a human) alleviates a symptom, ameliorates a condition, or slows the onset of disease conditions according to clinically acceptable standards for the disorder or condition to be treated or the cosmetic purpose, e.g., at a reasonable benefit/risk ratio applicable to any medical treatment.

As used herein, the term "treating" or "treatment" includes reversing, reducing, or arresting the symptoms, clinical signs, and underlying pathology of a condition in manner to improve or stabilize a subject's condition. As used herein, the terms "treating" or "treatment" of a neoplastic disorder can refer to executing a treatment protocol to eradicate at least one neoplastic cell. Thus, "treating" or "treatment" does not require complete eradication of neoplastic cells.

"PSMA" refers to Prostate Specific Membrane Antigen, a potential carcinoma marker that has been hypothesized to serve as a target for imaging and cytotoxic treatment modalities for cancer.

As used herein, the term "subject" can refer to any animal, including, but not limited to, humans and non-human animals (e.g., rodents, arthropods, insects, fish (e.g., zebrafish)), non-human primates, ovines, bovines, ruminants, lagomorphs, porcines, caprines, equines, canines, felines, aves, etc.), which is to be the recipient of a particular treatment.

As used herein, the term "imaging probe" can refer to a biological or chemical moiety that may be used to detect, image, and/or monitor the presence and/or progression of a cell cycle, cell function/physiology, condition, pathological disorder and/or disease.

As used herein, the term "nanoparticle" refers to any particle having a diameter of less than 1000 nanometers (nm). In some embodiments, nanoparticles can be optically or magnetically detectable. In some embodiments, intrinsically fluorescent or luminescent nanoparticles, nanoparticles that comprise fluorescent or luminescent moieties, plasmon resonant nanoparticles, and magnetic nanoparticles are among the detectable nanoparticles that are used in various embodiments. In general, the nanoparticles should have dimensions small enough to allow their uptake by eukaryotic cells. Typically, the nanoparticles have a longest straight dimension (e.g., diameter) of 200 nm or less. In some embodiments, the nanoparticles have a diameter of 100 nm or less. Smaller nanoparticles, e.g., having diameters of 50 nm or less, e.g., about 1 nm to about 30 nm or about 1 nm to about 5 nm, are used in some embodiments.

Embodiments described herein relate to a photodynamic therapy composition its use in diagnostic, therapeutic, and theranostic applications and particularly for use in photodynamic therapy (PDT). The photodynamic therapy composition includes a plurality of targeted phthalocyanine gold nanoparticle conjugates. Each targeted phthalocyanine gold nanoparticle conjugate includes a plurality of phthalocyanine compounds covalently coupled to a surface of the gold nanoparticle via bio-cleavable linker and a plurality of cancer or tissue targeting moieties coupled to the gold nanoparticle for targeting the conjugate to a tissue or cancer cell.

The phthalocyanine compounds of a photodynamic therapy composition disclosed herein are analogs of the PDT photosensitizing drug Pc4 that are modified with a bio-cleavable linker to allow for covalent attachment of the compound to the surface of a gold nanoparticle, increased cellular uptake, as well as controllable release and activity of the phthalocyanine compound from the gold nanoparticle. The targeted phthalocyanine gold nanoparticle conjugates disclosed herein have been found to be effective in in vivo targeted bioimaging and targeted PDT of cancer cells when irradiated with a near infrared (NIR) light.

In some embodiments, the phthalocyanine compounds of the photodynamic therapy composition can have the following formula (I):

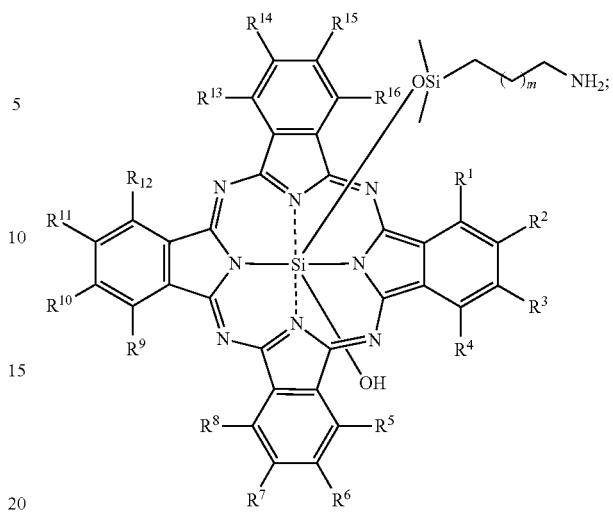

wherein m is 1-5;
$R^1$, $R^4$, $R^5$, $R^8$, $R^9$, $R^{12}$, $R^{13}$, and $R^{16}$ are each independently selected from the group consisting of hydrogen, halogen, nitro, cyano, hydroxyl, thiol, amino, and methyl;
$R^2$, $R^3$, $R^6$, $R^7$, $R^{10}$, $R^{11}$, $R^{14}$, and $R^{15}$ are each independently selected from the group consisting of hydrogen, halogen, nitro, cyano, hydroxyl, thiol, amino, carboxy, aryl, heteroaryl, carbocyclyl, heterocyclyl, $C_{1-6}$ alkyl, $C_{1-6}$ alkenyl, $C_{1-6}$ alkynyl, $C_{1-6}$ alkoxy, $C_{1-6}$ acyl, $C_{1-6}$ alkylcarbonyloxy, $C_{1-6}$ carbocyclylalkyl, $C_{1-6}$ aminoalkyl, $C_{1-6}$ alkylamino, $C_{1-6}$ thioalkyl, $C_{1-6}$alkylthio, $C_{1-6}$hydroxyalkyl, $C_{1-6}$ alkyloxycarbonyl, $C_{1-6}$ alkylaminocarbonyl, and $C_{1-6}$ alkylcarbonylamino; and pharmaceutically acceptable salts thereof.

In certain embodiments, $R^1$-$R^{16}$ of the compound of formula (I) are independently selected from the group consisting of hydrogen, halogen, nitro, cyano, hydroxyl, thiol, amino, and methyl, while in other embodiments $R^1$-$R^{16}$ are all hydrogen.

In other embodiments, the phthalocyanine compound of the photodynamic therapy composition can have the formula (II):

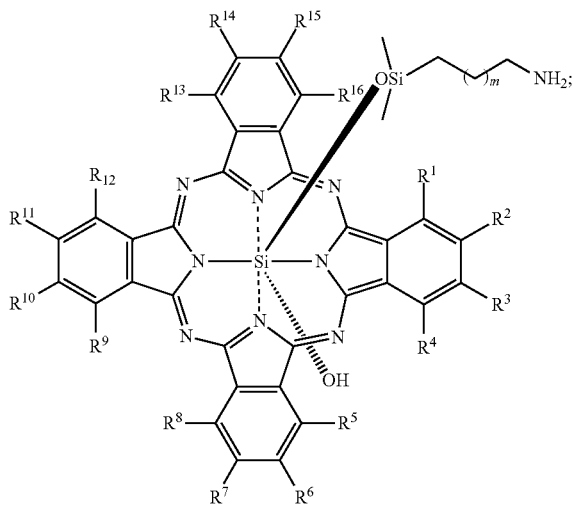

wherein m is 1-5;

R$^1$, R$^4$, R$^5$, R$^8$, R$^9$, R$^{12}$, R$^{13}$, and R$^{16}$ are each independently selected from the group consisting of hydrogen, halogen, nitro, cyano, hydroxyl, thiol, amino, and methyl;

R$^2$, R$^3$, R$^6$, R$^7$, R$^{10}$, R$^{11}$, R$^{14}$, and R$^{15}$ are each independently selected from the group consisting of hydrogen, halogen, nitro, cyano, hydroxyl, thiol, amino, carboxy, aryl, heteroaryl, carbocyclyl, heterocyclyl, C$_{1-6}$ alkyl, C$_{1-6}$ alkenyl, C$_{1-6}$ alkynyl, C$_{1-6}$ alkoxy, C$_{1-6}$ acyl, C$_{1-6}$ alkylcarbonyloxy, C$_{1-6}$ carbocyclylalkyl, C$_{1-6}$ aminoalkyl, C$_{1-6}$ alkylamino, C$_{1-6}$ thioalkyl, C$_{1-6}$alkylthio, C$_{1-6}$hydroxyalkyl, C$_{1-6}$ alkyloxycarbonyl, C$_{1-6}$ alkylaminocarbonyl, and C$_{1-6}$ alkylcarbonylamino; and pharmaceutically acceptable salts thereof.

In some embodiments, R$^1$-R$^{16}$ are independently selected from the group consisting of hydrogen, halogen, nitro, cyano, hydroxyl, thiol, amino, and methyl.

In still other embodiments, the phthalocyanine compound of the photodynamic therapy composition can have the formula (III):

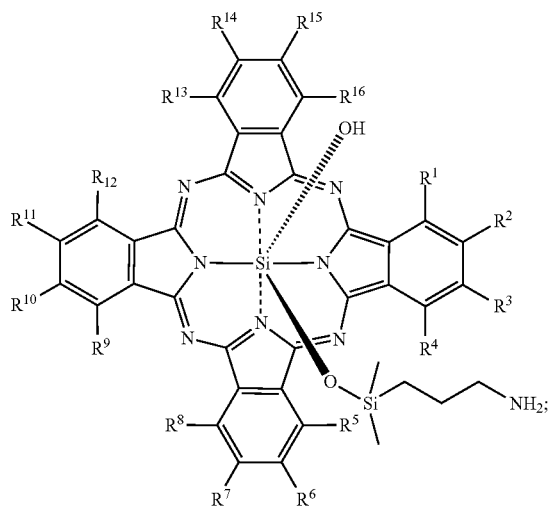

wherein m is 1-5;

R$^1$, R$^4$, R$^5$, R$^8$, R$^9$, R$^{12}$, R$^{13}$, and R$^{16}$ are each independently selected from the group consisting of hydrogen, halogen, nitro, cyano, hydroxyl, thiol, amino, and methyl;

R$^2$, R$^3$, R$^6$, R$^7$, R$^{10}$, R$^{11}$, R$^{14}$, and R$^{15}$ are each independently selected from the group consisting of hydrogen, halogen, nitro, cyano, hydroxyl, thiol, amino, carboxy, aryl, heteroaryl, carbocyclyl, heterocyclyl, C$_{1-6}$ alkyl, C$_{1-6}$ alkenyl, C$_{1-6}$ alkynyl, C$_{1-6}$ alkoxy, C$_{1-6}$ acyl, C$_{1-6}$ alkylcarbonyloxy, C$_{1-6}$ carbocyclylalkyl, C$_{1-6}$ aminoalkyl, C$_{1-6}$ alkylamino, C$_{1-6}$ thioalkyl, C$_{1-6}$alkylthio, C$_{1-6}$hydroxyalkyl, C$_{1-6}$ alkyloxycarbonyl, C$_{1-6}$ alkylaminocarbonyl, and C$_{1-6}$ alkylcarbonylamino; and pharmaceutically acceptable salts thereof.

In some embodiments, R$^1$-R$^{16}$ are independently selected from the group consisting of hydrogen, halogen, nitro, cyano, hydroxyl, thiol, amino, and methyl.

In certain embodiments, the phthalocyanine compound of formula (I) is Pc158 having the formula:

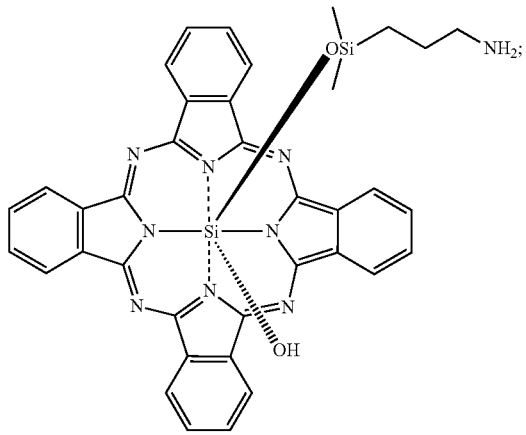

or pharmaceutically acceptable salts thereof.

In some embodiments, phthalocyanine compounds described herein can be linked to a gold nanoparticle to form a phthalocyanine gold nanoparticle conjugate. In an exemplary embodiment, the phthalocyanine gold nanoparticle conjugate includes a plurality of the phthalocyanine compound, Pc158, covalently coupled to the surface of a gold nanoparticle (i.e., an AuNP-Pc158 conjugate). In certain embodiments, the gold nanoparticles are optically detectable gold nanoparticles.

In alternative embodiments, metals used in place of gold to form metal nanoparticles for use in a photodynamic therapy composition include, but are not limited to, silver, iron, cobalt, zinc, cadmium, nickel, gadolinium, chromium, copper, manganese, palladium, tin, and alloys and/or oxides thereof. In some embodiments, the metal nanoparticles can be magnetic nanoparticles. "Magnetic particles" refers to magnetically responsive particles that contain one or more metals or oxides or hydroxides thereof. In some embodiments, the nanoparticles can have an average diameter of about 1 nm to about 30 nm. In other embodiment, the nanoparticles can have an average diameter of about 5 nm or less. Nanoparticles with an average or nominal diameter of about 5 nm or less can be readily cleared from the subject by reticular endothelium system after delivery of the hydrophobic therapeutic agent to the targeted cell or tissue.

The gold nanoparticle can be coated with a polymer. The polymers used to coat the gold nanoparticles can include natural proteins, such as bovine serum albumin (BSA), biocompatible hydrophilic polymers, such as polyethylene glycol (PEG) or a PEG derivative, phospholipid-(PEG), lipids, and carbohydrates, such as dextran. Coatings of polymer may be applied or assembled in a variety of ways, such as by dipping, using a layer-by-layer technique, by self-assembly, or conjugation. Self-assembly refers to a process of spontaneous assembly of a higher order structure that relies on the natural attraction of the components of the higher order structure (e.g., molecules) for each other. Self-assembly typically occurs through random movements of the molecules and formation of bonds based on size, shape, composition, or chemical properties.

In one embodiment, the polymer coating can include polyethylene glycol (PEG). The PEG can be a heterobifunctional PEG, such as COOH-PEG-SH (MW 3000), and/or a monofunctional PEG, such as PEG-SH (MW 5000), that can readily bind to the nanoparticle to coat the nanoparticle. In some embodiments, the nanoparticle can be coated with a mixture of hetero-bifunctional PEG, such as COOH-PEG-SH (MW 3000), and monofunctional PEG, such as PEG-SH (MW 5000). The mixture can range in percent composition of hetero-bifunctional PEG to monofunctional PEG of about 1:99, 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, and 99:1 respectively.

The gold nanoparticle, or AuNP, can be indirectly coupled or conjugated to the axial amino group attached to the central silicon metalloid of a phthalocyanine compound described herein. In some embodiments, the phthalocyanine compound can be indirectly coupled or conjugated to the nanoparticle via a linker. In certain embodiments, the phthalocyanine compound, e.g., Pc158, is nonfluorescent and completely quenched and in a deactivated state when conjugated to the gold nanoparticle via the linker.

The linker can be of any suitable length and contain any suitable number of atoms and/or subunits. The linker can include one or a combination of chemical and/or biological moieties. Examples of linkers for coupling or conjugating phthalocyanine compounds to a gold nanoparticle for use in a composition described herein can include biocleavable peptide linkers, such as lysosomal enzymatically degradable oligopeptides. The biocleavable linker can include a tumor microenvironment-responsive linker that allows for tumor selective switching of the phthalocyanine compound, Pc158 from a deactivated state when conjugated to AuNP to an activated state when cleaved and released from the conjugate.

Cathepsins are highly abundant within intracellular endolysosomal vesicles in cancers. Cathepsin B is a lysosomal cysteine protease overexpressed in many tumor cells. Thus, in some embodiments, the biocleavable peptide linker can include a cathepsin B sensitive peptide linker having a cysteine residue. In certain embodiments, the biocleavable peptide linker can have the amino acid sequence GFLGC (SEQ ID NO:1). In an exemplary embodiment, the biocleavable peptide linker having SEQ ID NO:1 allows the first glycine residue to conjugate to the axial amino group attached to the central silicon metalloid of the phthalocyanine compound of formula (I) (see FIG. 1a) and the terminal cysteine residue of the biocleavable linker to directly conjugate a gold nanoparticle via an Au—S bond.

The amount of phthalocyanine compound loaded onto the targeted gold nanoparticle can be controlled by changing the size of the gold nanoparticles or the composition of the polymer coating. In an exemplary embodiment, an average of 3.2 Pc158 molecules can be loaded onto each gold nanoparticle, where the Pc158 molecules are conjugated to the nanoparticle via a biocleavable peptide linker having SEQ ID NO:1.

The nanoparticle phthalocyanine compound conjugate can additionally be indirectly or directly coupled or conjugated to at least one targeting moiety to target and/or adhere the nanoparticle phthalocyanine compound conjugate to a cell or tissue of interest. The targeted phthalocyanine gold nanoparticle conjugates can target and transiently interact with, bind to, and/or couple with a cancer cell, such as a prostate cancer cell, and once interacting with, bound to, or coupled to the targeted cell or tissue advantageously facilitate delivery of the phthalocyanine gold nanoparticle conjugates within the cell by, for example, receptor mediated endocytosis. The photodynamic therapy composition including the phthalocyanine gold nanoparticle conjugates and the targeting moiety can be administered to a subject for diagnostic, therapeutic, and/or theranostic applications.

The targeting moiety can include any molecule, or complex of molecules, which is/are capable of interacting with an intracellular, cell surface, or extracellular biomarker of the cell. The biomarker can include, for example, a cellular protease, a kinase, a protein, a cell surface receptor, a lipid, and/or fatty acid. Other examples of biomarkers that the targeting moiety can interact with include molecules associated with a particular disease. For example, the biomarkers can include cell surface receptors implicated in cancer, such as prostate specific membrane antigen (PSMA), CA-125 receptor, epidermal growth factor receptor, and transferrin receptor. The targeting moiety can interact with the biomarkers through non-covalent binding, covalent binding, hydrogen binding, van der Waals forces, ionic bonds, hydrophobic interactions, electrostatic interaction, and/or combinations thereof.

In some embodiments, the targeting moiety can be indirectly coupled or conjugated to the gold nanoparticle via a linker. The linker can be of any suitable length and contain any suitable number of atoms and/or subunits. The linker can include one or a combination of chemical and/or biological moieties. Examples of chemical moieties can include alkyl groups, methylene carbon chains, ether, polyether, alkyl amide linkers, alkenyl chains, alkynyl chains, disulfide groups, and polymers, such as poly(ethylene glycol) (PEG), functionalized PEG, PEG-chelant polymers, dendritic polymers, and combinations thereof. Examples of biological moieties can include peptides, modified peptides, streptavidin-biotin or avidin-biotin, polyaminoacids (e.g., polylysine), polysaccharides, glycosaminoglycans, oligonucleotides, phospholipid derivatives, and combinations thereof.

In an exemplary embodiment, the targeting moiety is coupled or conjugated to the gold nanoparticle via a PEG5k polymer linker. The targeting moiety can be coupled to the polymer linker prior to and/or after coupling of the polymer linker to the gold nanoparticle.

The targeting moiety can include, but is not limited to, synthetic compounds, natural compounds or products, macromolecular entities, bioengineered molecules (e.g., polypeptides, lipids, polynucleotides, antibodies, antibody fragments), and small entities (e.g., small molecules, neurotransmitters, substrates, ligands, hormones and elemental compounds).

The targeting moiety can include an antibody, such as a monoclonal antibody, a polyclonal antibody, or a humanized antibody, including without limitation: Fv fragments, single chain Fv (scFv) fragments, Fab' fragments, F(ab')2 fragments, single domain antibodies, camelized antibodies and antibody fragments, humanized antibodies and antibody fragments, and multivalent versions of the foregoing; multivalent targeting moieties including without limitation: monospecific or bispecific antibodies, such as disulfide stabilized Fv fragments, scFv tandems ((scFv)$_2$ fragments), diabodies, tribodies or tetrabodies, which typically are covalently linked or otherwise stabilized (i.e., leucine zipper or helix stabilized) scFv fragments; and receptor molecules, which naturally interact with a desired target molecule.

Preparation of antibodies may be accomplished by any number of well-known methods for generating antibodies. These methods typically include the step of immunization of animals, typically mice, with a desired immunogen (e.g., a desired target molecule or fragment thereof). Once the mice have been immunized and boosted one or more times with the desired immunogen(s), antibody-producing hybridomas may be prepared and screened according to well known methods. See, for example, Kuby, Janis, Immunology, Third Edition, pp. 131-139, W.H. Freeman & Co. (1997), for a general overview of monoclonal antibody production, that portion of which is incorporated herein by reference.

The targeting moiety need not originate from a biological source. The targeting moiety may, for example, be screened from a combinatorial library of synthetic peptides. One such method is described in U.S. Pat. No. 5,948,635, incorporated herein by reference, which describes the production of phagemid libraries having random amino acid insertions in the pIII gene of M13. This phage may be clonally amplified by affinity selection.

The immunogens used to prepare targeting moieties having a desired specificity will generally be the target molecule, or a fragment or derivative thereof. Such immunogens may be isolated from a source where they are naturally occurring or may be synthesized using methods known in the art. For example, peptide chains may be synthesized by 1-ethyl-3-[dimethylaminoproply]carbodiimide (EDC)-catalyzed condensation of amine and carboxyl groups. In certain embodiments, the immunogen may be linked to a carrier bead or protein. For example, the carrier may be a functionalized bead such as SASRIN resin commercially available from Bachem, King of Prussia, Pa. or a protein such as keyhole limpet hemocyanin (KLH) or bovine serum albumin (BSA). The immunogen may be attached directly to the carrier or may be associated with the carrier via a linker, such as a non-immunogenic synthetic linker (for example, a polyethylene glycol (PEG) residue, amino caproic acid or derivatives thereof) or a random, or semi-random polypeptide.

In certain embodiments, it may be desirable to mutate the binding region of the polypeptide targeting moiety and select for a targeting moiety with superior binding characteristics as compared to the un-mutated targeting moiety. This may be accomplished by any standard mutagenesis technique, such as by PCR with Taq polymerase under conditions that cause errors. In such a case, the PCR primers could be used to amplify scFv-encoding sequences of phagemid plasmids under conditions that would cause mutations. The PCR product may then be cloned into a phagemid vector and screened for the desired specificity, as described above.

In other embodiments, the targeting moiety may be modified to make them more resistant to cleavage by proteases. For example, the stability of targeting moiety comprising a polypeptide may be increased by substituting one or more of the naturally occurring amino acids in the (L) configuration with D-amino acids. In various embodiments, at least 1%, 5%, 10%, 20%, 50%, 80%, 90% or 100% of the amino acid residues of targeting moiety may be of the D configuration. The switch from L to D amino acids neutralizes the digestion capabilities of many of the ubiquitous peptidases found in the digestive tract. Alternatively, enhanced stability of a targeting moiety comprising a peptide bond may be achieved by the introduction of modifications of the traditional peptide linkages. For example, the introduction of a cyclic ring within the polypeptide backbone may confer enhanced stability in order to circumvent the effect of many proteolytic enzymes known to digest polypeptides in the stomach or other digestive organs and in serum. In still other embodiments, enhanced stability of a targeting moiety may be achieved by intercalating one or more dextrorotatory amino acids (such as, dextrorotatory phenylalanine or dextrorotatory tryptophan) between the amino acids of targeting moiety. In exemplary embodiments, such modifications increase the protease resistance of a targeting moiety without affecting the activity or specificity of the interaction with a desired target molecule.

In certain embodiments, the antibodies or variants thereof may be modified to make them less immunogenic when administered to a subject. For example, if the subject is human, the antibody may be "humanized"; where the complimentarily determining region(s) of the hybridoma-derived antibody has been transplanted into a human monoclonal antibody, for example as described in Jones, P. et al. (1986), Nature, 321, 522-525 or Tempest et al. (1991), Biotechnology, 9, 266-273. Also, transgenic mice, or other mammals, may be used to express humanized antibodies. Such humanization may be partial or complete.

In certain embodiments, a targeting moiety as described herein may comprise a homing peptide, which selectively directs the phthalocyanine compound nanoparticle conjugates to a targeted cell. Homing peptides for a targeted cell can be identified using various methods well known in the art. Many laboratories have identified the homing peptides that are selective for cells of the vasculature of brain, kidney, lung, skin, pancreas, intestine, uterus, adrenal gland, retina, muscle, prostate, or tumors. See, for example, Samoylova et al., 1999, Muscle Nerve, 22:460; Pasqualini et al., 1996 Nature, 380:364; Koivunen et al., 1995, Biotechnology, 13:265; Pasqualini et al., 1995, J. Cell Biol., 130:1189; Pasqualini et al., 1996, Mole. Psych., 1:421, 423; Rajotte et al., 1998, J. Clin. Invest., 102:430; Rajotte et al., 1999, J. Biol. Chem., 274:11593. See, also, U.S. Pat. Nos. 5,622, 6999; 6,068,829; 6,174,687; 6,180,084; 6,232,287; 6,296, 832; 6,303,573; and 6,306,365.

Phage display technology provides a means for expressing a diverse population of random or selectively randomized peptides. Various methods of phage display and methods for producing diverse populations of peptides are well known in the art. For example, methods for preparing diverse populations of binding domains on the surface of a phage have been described in U.S. Pat. No. 5,223,409. In particular, phage vectors useful for producing a phage display library as well as methods for selecting potential binding domains and producing randomly or selectively mutated binding domains are also provided in U.S. Pat. No. 5,223,409. Similarly, methods of producing phage peptide display libraries, including vectors and methods of diversifying the population of peptides that are expressed are also described in Smith et al., 1993, Meth. Enzymol., 217:228-257, Scott et al., Science, 249:386-390, and two PCT publications WO 91/07141 and WO 91/07149. Phage display technology can be particularly powerful when used, for example, with a codon-based mutagenesis method, which can be used to produce random peptides or randomly or desirably biased peptides (see, e.g., U.S. Pat. No. 5,264, 563). These or other well-known methods can be used to produce a phage display library, which can be subjected to the in vivo phage display method in order to identify a peptide that homes to one or a few selected tissues.

In vitro screening of phage libraries has previously been used to identify peptides that bind to antibodies or cell surface receptors (see, e.g., Smith, et al., 1993, Meth. Enzymol., 217:228-257). For example, in vitro screening of phage peptide display libraries has been used to identify novel peptides that specifically bind to integrin adhesion receptors (see, e.g., Koivunen et al., 1994, J. Cell Biol. 124:373-380), and to the human urokinase receptor (Goodson, et al., 1994, Proc. Natl. Acad. Sci., USA 91:7129-7133).

In certain embodiments, the targeting moiety may comprise a receptor molecule, including, for example, receptors, which naturally recognize a specific desired molecule of a target cell. Such receptor molecules include receptors that have been modified to increase their specificity of interaction with a target molecule, receptors that have been modified to interact with a desired target molecule not naturally recognized by the receptor, and fragments of such receptors (see, e.g., Skerra, 2000, J. Molecular Recognition, 13:167-187). A preferred receptor is a chemokine receptor. Exemplary chemokine receptors have been described in, for example, Lapidot et al, 2002, Exp Hematol, 30:973-81 and Onuffer et al, 2002, Trends Pharmacol Sci, 23:459-67.

In still other embodiments, the targeting moiety may comprise an aptamer. Aptamers are oligonucleotides that are selected to bind specifically to a desired molecular structure of the target cell. Aptamers typically are the products of an affinity selection process similar to the affinity selection of phage display (also known as in vitro molecular evolution). The process involves performing several tandem iterations of affinity separation, e.g., using a solid support to which the diseased immunogen is bound, followed by polymerase chain reaction (PCR) to amplify nucleic acids that bound to the immunogens. Each round of affinity separation thus enriches the nucleic acid population for molecules that successfully bind the desired immunogen. In this manner, a random pool of nucleic acids may be "educated" to yield aptamers that specifically bind target molecules. Aptamers typically are RNA, but may be DNA or analogs or derivatives thereof, such as, without limitation, peptide nucleic acids (PNAs) and phosphorothioate nucleic acids.

In yet other embodiments, the targeting moiety may be a peptidomimetic. By employing, for example, scanning mutagenesis to map the amino acid residues of a protein, which is involved in binding other proteins, peptidomimetic compounds can be generated that mimic those residues, which facilitate the interaction. Such mimetics may then be used as a targeting moiety to deliver the phthalocyanine compound to a target cell. For instance, non-hydrolyzable peptide analogs of such resides can be generated using benzodiazepine (e.g., see Freidinger et al. in Peptides: Chemistry and Biology, G. R. Marshall ed., ESCOM Publisher: Leiden, Netherlands, 1988), azepine (e.g., see Huffman et al. in Peptides: Chemistry and Biology, G. R. Marshall ed., ESCOM Publisher: Leiden, Netherlands, 1988), substituted gamma lactam rings (Garvey et al. in Peptides: Chemistry and Biology, G. R. Marshall ed., ESCOM Publisher: Leiden, Netherlands, 1988), keto-methylene pseudopeptides (Ewenson et al., 1986, J Med Chem 29:295; and Ewenson et al., in Peptides: Structure and Function (Proceedings of the 9th American Peptide Symposium) Pierce Chemical Co. Rockland, Ill., 1985), b-turn dipeptide cores (Nagai et al., 1985, Tetrahedron Lett 26:647; and Sato et al., 1986, J Chem Soc Perkin Trans 1:1231), and β-aminoalcohols (Gordon et al., 1985, Biochem Biophys Res Cummun 126:419; and Dann et al., 1986, Biochem Biophys Res Commun 134:71).

In other embodiments, the targeting moiety may comprise a ligand molecule, including, for example, ligands which naturally recognize a specific desired receptor of a target cell. Such ligand molecules include ligands that have been modified to increase their specificity of interaction with a target receptor, ligands that have been modified to interact with a desired receptor not naturally recognized by the ligand, and fragments of such ligands.

By way of example, where the cell targeted is a prostate cancer cell, the targeting moiety can comprise a PSMA ligand. Pathological studies indicate that PSMA is expressed by virtually all prostate cancers, and its expression is further increased in poorly differentiated, metastatic, and hormone-refractory carcinomas. Higher PSMA expression is also found in cancer cells from castration-resistant prostate cancer patients. Increased PSMA expression is reported to correlate with the risk of early prostate cancer recurrence after radical prostatectomy. In addition to being overexpressed in prostate cancer (PCa), PSMA is also expressed in the neovasculature of neoplasms including but not limited to conventional (clear cell) renal carcinoma, transitional cell carcinoma of the urinary bladder, testicular embryonal carcinoma, colonic adenocarcinoma, neuroendocrine carcinoma, gliobastoma multiforme, malignant melanoma, pancreatic ductal carcinoma, non-small cell lung carcinoma, soft tissue carcinoma, breast carcinoma, and prostatic adenocarcinoma.

In certain embodiments, the targeting moiety conjugated to a nanoparticle in a phthalocyanine compound nanoparticle conjugate described herein can comprise a highly negatively charged PSMA ligand (e.g., PSMA-1) for PSMA-targeted imaging of prostate cancer PSMA-1 ligand. Examples of PSMA ligand for use in a photodynamic therapy composition described herein are described and claimed in U.S. Pat. Nos. 9,889,199 and 10,709,794, the disclosures of which are incorporated herein in their entirety.

The targeted phthalocyanine gold nanoparticle conjugates can be provided in a pharmaceutical composition with pharmaceutically acceptable carrier. The preparation of a pharmacological composition that contains active ingredients dissolved or dispersed therein is well understood in the art. Typically, such compositions are prepared as injectables as either liquid solutions or suspensions, however, solid forms suitable for solution, or suspensions, in liquid prior to use can also be prepared. Formulation will vary according to the route of administration selected (e.g., solution, emulsion, capsule). In certain embodiments, the formulation is prepared for intravenous injection to a mammalian subject.

Standard pharmaceutical formulation techniques can be employed, such as those described in Remington's Pharmaceutical Sciences, ibid. Suitable pharmaceutical carriers for parenteral administration include, for example, sterile water, physiological saline, bacteriostatic saline (saline containing about 0.9% mg/ml benzyl alcohol), phosphate-buffered saline, Hank's solution, Ringer's-lactate and the like. Methods for encapsulating compositions (such as in a coating of hard gelatin or cyclodextran) are known in the art (Baker, et al., "Controlled Release of Biological Active Agents", John Wiley and Sons, 1986). "Pharmaceutically acceptable carrier" as used herein means a pharmaceutically acceptable material, composition or vehicle, such as a liquid or solid filler, diluent, excipient, solvent or encapsulating material, involved in carrying or transporting the subject chemical from one organ or portion of the body, to another organ or portion of the body. Each carrier must be "acceptable" in the sense of being compatible with the other ingredients of the formulation and not injurious to the patient. Some examples of materials which can serve as pharmaceutically acceptable carriers include: sugars, such as lactose, glucose, and sucrose; starches, such as corn starch and potato starch; cellulose, and its derivatives, such as sodium carboxymethyl cellulose, ethyl cellulose, and cellulose acetate; powdered tragacanth; malt; gelatin; talc; excipients, such as cocoa butter and suppository waxes; oils, such as peanut oil, cottonseed oil, safflower oil, sesame oil, olive oil, corn oil, and soybean oil; glycols, such as propylene glycol; polyols, such as glycerin, sorbitol, mannitol, and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; and other non-toxic compatible substances employed in pharmaceutical formulations.

In some embodiments, aqueous-based or oil-based pharmaceutically acceptable carriers can be used. An aqueous-based pharmaceutically acceptable carrier is a polar solution primarily consisting of water, and including solutions such as pyrogen-free water, isotonic saline, Ringer's solution, and phosphate buffer solutions. Oil-based pharmaceutically acceptable carriers, on the other hand, are relatively non-polar solutions consisting primarily of oils or other relatively non-polar organic solvents. Examples of oil-based pharmaceutically acceptable carriers include various organic solvents, mineral oil, vegetable oil, and petrolatum.

In some embodiments, targeted phthalocyanine gold nanoparticle conjugates can be formulated for systemic or topical administration. Systemic administration includes delivery of an aqueous solution, preferably a buffered aqueous solution, including a phthalocyanine compound or targeted conjugate thereof. Systemic formulations typically also include a dispersant. Systemic administration is typically done parenterally (e.g., intravenously or intramuscularly). However, systemic administration can also be carried out by oral administration. By way of example, targeted phthalocyanine gold nanoparticle conjugates can be intravenously administered to a subject that is known to or suspected of having a tumor.

Topical administration of targeted phthalocyanine gold nanoparticle conjugates can be accomplished using various different formulations such as powders, sprays, ointments, pastes, creams, lotions, gels, solutions, or patches. The active component may be mixed under sterile conditions with a pharmaceutically acceptable carrier, and with any preservatives, buffers, or propellants which may be required. The ointments, pastes, creams, solutions, foams, lacquers, oils and gels may contain excipients in addition to targeted phthalocyanine gold nanoparticle conjugates. These formulations may contain a phthalocyanine salt within or on micro or nanoparticles, liposomes, beads, polymer matrices, sponges, osmotic pumps, or other structures.

Targeted phthalocyanine gold nanoparticle conjugates can be formulated as ointments or creams for topical administration. Ointments are homogeneous, semi-solid preparations intended for external application to the skin or mucous membranes. They are used as emollients or for the application of active ingredients to the skin for protective, therapeutic, or prophylactic purposes and where a degree of occlusion is desired. Ointments can be formulated using hydrophobic, hydrophilic, or water-emulsifying bases to provide preparations for various applications. Creams, on the other hand, are semi-solid emulsions, i.e., a mixture of oil and water. They are divided into two types: oil-in-water creams which are composed of small droplets of oil dispersed in a continuous aqueous phase, and water-in-oil creams which are composed of small droplets of water dispersed in a continuous oily phase.

Targeted phthalocyanine gold nanoparticle conjugates described herein can also be administered by aerosol. This is accomplished by preparing an aqueous aerosol, liposomal preparation, or solid particles containing the compound. A nonaqueous (e.g., fluorocarbon propellant) suspension could be used. Sonic nebulizers are preferred because they minimize exposing the agent to shear, which can result in degradation of the compound. Ordinarily, an aqueous aerosol is made by formulating an aqueous solution or suspension of the agent together with conventional pharmaceutically acceptable carriers and stabilizers.

Targeted phthalocyanine gold nanoparticle conjugates can also be formulated for delivery as a gel. Gel formulations comprising a phthalocyanine compound or salt thereof may be prepared according to U.S. Pat. No. 6,617,356 or 5,914,334, the disclosures of which are incorporated herein in their entirety. In addition, targeted phthalocyanine gold nanoparticle conjugate-containing gels can be dried to form films suitable for phthalocyanine and/or gold nanoparticle administration.

Transdermal patches have the added advantage of providing controlled delivery of a targeted phthalocyanine gold nanoparticle conjugate to the body. Such dosage forms can be made by dissolving or dispersing the agent in the proper medium. Absorption enhancers can also be used to increase the flux of the photosensitizer(s) into the skin. The rate of such flux can be controlled by either providing a rate controlling membrane or dispersing the agent in a polymer matrix or gel.

Targeted phthalocyanine gold nanoparticle conjugates can also be delivered transdermally using microneedles. See for example Arora et al., International Journal of Pharmaceutics, 364, pg. 227-236 (2008), which describes micro-scale devices for transdermal drug delivery.

Delivery of targeted phthalocyanine gold nanoparticle conjugates described herein across an epithelial, epidermal, serosal or mucosal surface may be accomplished using application of an electrical current and a charged solvent solution, such as iontophoresis.

In some embodiments, a photodynamic therapy composition including a plurality of targeted phthalocyanine gold nanoparticle conjugates described herein can be administered to a subject in a detectable and/or imaging effective quantity. A "detectable quantity" means that the amount of the detectable compound that is administered is sufficient to enable detection of binding of the targeted phthalocyanine gold nanoparticle conjugates to the targeted cell or tissue, e.g., a cancer cell. An "imaging effective quantity" means that the amount of the detectable compound that is administered is sufficient to enable imaging of binding of the compound to the targeted cells.

In some embodiments, the photodynamic therapy composition including a plurality of targeted phthalocyanine gold nanoparticle conjugates described herein can be administered to a subject for imaging at least one region of interest (ROI) of the subject. The ROI can include a particular area or portion of the subject and, in some instances, two or more areas or portions throughout the entire subject. The ROI can include, for example, pulmonary regions, gastrointestinal regions, cardiovascular regions (including myocardial tissue), renal regions, as well as other bodily regions, tissues, lymphocytes, receptors, organs and the like, including the vasculature and circulatory system, and as well as diseased tissue, including neoplastic or cancerous tissue. The ROI can include regions to be imaged for both diagnostic and therapeutic purposes. The ROI is typically internal; however, it will be appreciated that the ROI may additionally or alternatively be external.

At least one image of the ROI can be generated using an imaging modality. The imaging modality can include one or combination of known imaging techniques capable of visualizing the phthalocyanine compound or targeted conjugate thereof. Examples of imaging modalities can include ultrasound (US), magnetic resonance imaging (MRI), nuclear magnetic resonance (NMR), computed topography (CT), electron spin resonance (ESR), nuclear medical imaging, optical imaging, and positron emission topography (PET). The imaging modality can then be operated to generate a visible image of the ROI. In a subject known to or suspected of having a tumor, for example, an ultrasonic transducer can be applied to at least a portion of the ROI to image the target tissue. A visible image of the tumor can then be obtained, such that the presence, absence, and/or extent of a particular neoplastic disorder can be ascertained. It will be appreciated that the imaging modality may be used to generate a baseline image prior to administration of the composition. In this case, the baseline and post-administration images can be compared to ascertain the presence, absence, and/or extent of a particular disease or condition.

In certain embodiments, the photodynamic therapy composition including a plurality of targeted phthalocyanine gold nanoparticle conjugates and a pharmaceutically acceptable carrier described herein can be administered to a subject to determine the presence, location, and/or distribution of cancer cells, i.e., PSMA expressing cancer cells or PSMA expressing neovasculature of the cancer cells, in an organ or body area of a patient. The presence, location, and/or distribution of the detectable phthalocyanine compound in the animal's tissue, e.g., prostate tissue, can be visualized (e.g., with an in vivo imaging modality). "Distribution" as used herein is the spatial property of being scattered about over an area or volume. In this case, "the distribution of cancer cells" is the spatial property of cancer cells being scattered about over an area or volume included in the animal's tissue, e.g., prostate tissue. The distribution of the targeted phthalocyanine gold nanoparticle conjugates, and/or released phthalocyanine compounds may then be correlated with the presence or absence of cancer cells in the tissue. A distribution may be dispositive for the presence or absence of a cancer cells or may be combined with other factors and symptoms by one skilled in the art to positively detect the presence or absence of migrating or dispersing cancer cells, cancer metastases or define a tumor margin in the subject.

In one embodiment, a photodynamic therapy composition including a plurality of targeted phthalocyanine gold nanoparticle conjugates described herein may be administered to a subject to assess the distribution of targeted cancerous tumor cells in a subject and correlate the distribution to a specific location. Surgeons routinely use stereotactic techniques and intra-operative MRI (iMRI) in surgical resections. This allows them to specifically identify and sample tissue from distinct regions of the tumor such as the tumor edge or tumor center. Frequently, they also sample regions of targeted tissue on the tumor margin that are outside the tumor edge that appear to be grossly normal but are infiltrated by dispersing tumor cells upon histological examination.

The photodynamic therapy compositions described herein can be used in intra-operative imaging techniques to guide surgical resection and eliminate the "educated guess" of the location of the tumor by the surgeon. Previous studies have determined that more extensive surgical resection improves patient survival. Thus, the photodynamic therapy compositions described herein that function as diagnostic molecular imaging agents have the potential to increase patient survival rates.

In some embodiments, targeted phthalocyanine gold nanoparticle conjugates described herein can be formulated and used in a photodynamic therapy (PDT) to treat and/or detect cancer or tumor, such as a PSMA expressing cancer in a subject. Methods for conducting photodynamic therapy are known in the art. See for example Thierry Patrice. Photodynamic Therapy; Royal Society of Chemistry, 2004. Photodynamic therapy (PDT) is a site-specific treatment modality that requires the presence of a photosensitizer, light, and adequate amounts of molecular oxygen to destroy targeted tumors (Grossweiner, Li, The science of phototherapy. Springer: The Netherlands, 2005). Upon illumination, a photoactivated sensitizer transfers energy to molecular oxygen that leads to the generation of singlet oxygen ($O^2$) and other reactive oxygen species (ROS), which initiate apoptosis and oxidative damage to cancer cells. Only the cells that are exposed simultaneously to the PDT drug (which is non-toxic in the dark) and light are destroyed while surrounding healthy, non-targeted and nonirradiated cells are spared from photodamage. Furthermore, the fluorescence of the photosensitizer molecules enables simultaneous diagnostic optical imaging that can be used to guide the PDT cancer treatment. In some embodiments, PSMA-targeted phthalocyanine gold nanoparticle conjugate PDT agents can provide image guidance for prostate tumor resection and allow for subsequent PDT to eliminate unresectable or remaining cancer cells.

In some embodiments, the PSMA expressing cancer that is treated and/or detected is prostate cancer. In other embodiments, the PSMA expressing cancer that is treated and/or detected can include PSMA expressing malignant neoplasms, such a conventional (clear cell) renal carcinoma, transitional cell carcinoma of the urinary bladder, testicular embryonal carcinoma, colonic adenocarcinoma, neuroendocrine carcinoma, glioblastoma multiforme, malignant melanoma, pancreatic ductal carcinoma, non-small cell lung carcinoma, soft tissue carcinoma, breast carcinoma, and prostatic adenocarcinoma.

In other embodiments, a photodynamic therapy composition including a plurality of targeted phthalocyanine gold nanoparticle conjugates described herein can be used in a method for treating cancer on tissue surfaces, e.g., PSMA expressing cancer on tissue surfaces. In certain embodiments, the photodynamic therapy composition can be applied or administered to a surface of cancerous tissue and the surface can then be irradiated to treat the cancer. In some embodiments, the surface can be skin in the case of skin cancer, or an exposed internal surface in the case of other types of cancer.

Photodynamic therapy composition including a plurality of targeted phthalocyanine gold nanoparticle conjugates described herein can also be used with PDT to treat various other diseases or disorders. For example, targeted phthalocyanine gold nanoparticle conjugates can be used to purge bone marrow for autologous bone marrow transplantation, purge viruses from whole blood or blood components, treat psoriasis, treat warts, treat macular degeneration, or treat intra-arterial plaques.

In certain embodiments, a photodynamic therapy composition including a plurality of targeted phthalocyanine gold nanoparticle conjugates described herein can be used in PDT to treat cancer in a subject. In the method, photodynamic therapy composition including a plurality of targeted phthalocyanine gold nanoparticle conjugates described herein can be administered to a subject prior to the administration of light as a step in PDT. A plurality of targeted phthalocyanine gold nanoparticle conjugates described herein can be formulated to allow delivery in sufficient amounts and for a period of time(s) to be therapeutically effective.

In some embodiments, the targeted phthalocyanine gold nanoparticle conjugates formulated for a PDT treatment method can include PEGylated gold nanoparticles (AuNPs) that are modified with a PSMA ligand described herein and that are further conjugated to the phthalocyanine compound PDT therapeutic agent of formula (IV) (e.g., Pc158) that is spatially encaged and photophysically quenched through adsorption on the PEGylated nanoparticles. The AuNPs can have a diameter about 5 nm or less to allow efficient excretion via renal clearance after delivery of the targeted phthalocyanine gold nanoparticle conjugates. The PEGylated gold nanoparticles can each have an average or nominal diameter of about 38 nm.

In an exemplary embodiment, a photodynamic therapy composition including a plurality of targeted phthalocyanine gold nanoparticle conjugates for use in a composition for use in PDT treatment or method described herein can include a Pc158 phthalocyanine compound covalently coupled to the surface of a PSMA targeted PEGylated gold nanoparticle (i.e., a PSMA targeted AuNP-Pc158 conjugate compound) via a biocleavable linker.

It was shown that the PSMA-targeted AuNP-Pc158 conjugates as constructed are nonfluorescent and completely quenched and inactivated by efficient energy transfer to AuNPs and can no longer generate reactive oxygen species (ROS). It was further shown that PSMA-targeted AuNPs-Pc158 enter PSMA expressing cancer cells via receptor-mediated endocytosis and localize in lysosomes where the cathepsin-cleavable linker is cleaved. Upon cathepsin-induced cleavage, activated Pc158 is released over time, thereby enabling fluorescence and photoswitchable PDT activity at a tumor site in a subject. Therefore, in an exemplary embodiment, a therapeutic method described herein can include the step of administering to the subject at least one therapeutically effective amount of PDT, e.g., NIR light, following administration of a photodynamic therapy composition including a plurality of targeted phthalocyanine gold nanoparticle conjugates, e.g., PSMA-targeted AuNP-Pc158 conjugates described herein, to the subject, wherein the PDT induces the cytotoxic effects of the activated/released phthalocyanine compound (e.g., Pc158) at a tumor microenvironment site in the subject.

The photodynamic therapy composition including a plurality of targeted phthalocyanine gold nanoparticle conjugates can be administered to a subject with cancer (e.g., PSMA expressing prostate cancer) by systemic administration, such as intravenous administration. Upon administration, the targeted phthalocyanine gold nanoparticle conjugates can localize to and/or accumulate at the site of the targeted tumor or cancer. Transient binding and/or interaction of the targeted phthalocyanine gold nanoparticle conjugates with the prostate cancer cells allows the PDT therapeutic composition to be delivered to and taken up by the targeted prostate cancer cells by, for example, endocytosis. This uptake is specific to the targeted cancer cells, which allows selective targeting of the cancer cells in the subject by the administered targeted phthalocyanine gold nanoparticle conjugates.

Following administration of the targeted phthalocyanine gold nanoparticle conjugates and uptake by the targeted cancer cells and the subsequent cleavage and release of the phthalocyanine compound from the nanoparticle, the targeted cancer cells can be exposed to an amount of light effective to cause cancer cell damage and/or suppression of cancer cell growth in the subject. The light administered to a subject, which activates the phthalocyanine compound PDT therapeutic agent can be delivered to the targeted cancer cells using, using for example, semiconductor laser, dye laser, optical parametric oscillator or the like. It will be appreciated that any source light can be used as long as the light excites the phthalocyanine compound PDT therapeutic agent cleaved/released from the nanoparticle.

In some embodiments, the tumor site of a subject can be irradiated with near infrared (NIR) light using visible laser diodes. In an exemplary embodiment, where the phthalocyanine compound is Pc158, the tumor site can be subjected to NIR light irradiation to photoactivate cleaved/released Pc158 in cancer cells of a subject.

In some embodiments, the tumor site can be irradiated with an amount of NIR light effective to inhibit tumor recurrence in the subject. In certain embodiments, the tumor site can be irradiated with an amount of NIR light effective to induce the cytotoxic effects of the activated/released phthalocyanine compound at a tumor microenvironment site in the subject. Photoactivation of an active phthalocyanine compound, such as Pc158, using NIR light can specifically kill PSMA-expressing tumor cells while sparing the tumor microenvironment as well as the surrounding healthy tissues. In an exemplary embodiment, the PDT step of the method of treating a PSMA expressing cancer described herein can include NIR irradiating a tumor site in a subject with a visible diode laser emitting at 672 nm for a total radiant exposure of 150 J/cm$^2$.

It has been shown that the sustained release at a subject's tumor site of active phthalocyanine compound released from targeted phthalocyanine gold nanoparticle conjugates enable therapeutic methods including multiple sequential PDT treatments. As used herein, "sequential therapy" or a "sequential regimen" refers to any treatment regimen in which the subject is given one treatment followed by another treatment, e.g., two distinct but mutually reinforcing combinations of therapeutic agents/treatments. "Sequential therapy" or a "sequential regimen" can also refer to a treatment regimen that includes multiple administrations of a single therapeutic agent/treatment, e.g., one or more distinct doses of a therapeutic agent/treatment to a subject following an initial dose of the same agent/treatment.

It has been further shown that multiple sequential PDT treatments increase targeted phthalocyanine gold nanoparticle conjugate uptake upon each sequential administration, thereby compounding the therapeutic efficacy. Without being bound by theory, it is believed that repeated phthalocyanine compound fluorescence recovery in tumors following repeated PDT light administration in tumors is due to 1) a sustained phthalocyanine compound cleavage/release from nanoparticle conjugates already within the tumor; and 2) PDT enhanced targeted phthalocyanine gold nanoparticle conjugate accumulation at the tumor site.

Therefore, methods of treating cancer described here can include the sequential administration of targeted phthalocyanine gold nanoparticle conjugates (e.g., PSMA-targeted AuNPs-Pc158 conjugates) and PDT in the form of NIR light irradiation, where the conjugates are administered to a subject for a period of time prior to multiple sequential administrations of NIR light. Optionally, targeted phthalocyanine gold nanoparticle conjugates are administered to the subject for a period of time before and after the NIR light is administered. Optionally, the conjugates are administered to the subject for a period of time before the NIR light is administered, while the NIR light is administered and for a period of time after the NIR light is administered. In some embodiments, the period of time when targeted phthalocyanine gold nanoparticle conjugates are administered to the subject prior to an initial administration of NIR light may be at least about 1 hour, about 2 hours, about 6 hours, about 12 hours, about 18 hours, about 24 hours, or about 48 hours or more hours.

In some embodiments, a sequential regimen for the treatment of cancer in a subject can include period(s) of time where at least a portion of the phthalocyanine compound (e.g., Pc158) has been cleaved and released from the targeted phthalocyanine gold nanoparticle conjugates (e.g., PSMA targeted phthalocyanine AuNP conjugate) and is present in pharmacologically active form in the subject's body, for example, at the targeted site of a PSMA expressing tumor. It may be that NIR light is administered after at least a portion of phthalocyanine compounds linked to gold nanoparticles via a biocleavable linker are targeted to and cleaved and released within the cancer/tumor cells of the subject. In certain embodiments, NIR light can be administered after a sufficient portion of phthalocyanine compounds that allow for NIR-induced cancer cell death have been cleaved and released from targeted nanoparticles in the cancer cells.

It should be recognized that multiple cycles of photodynamic therapy composition administration may be performed where targeted phthalocyanine gold nanoparticle conjugates are administered and then the NIR light is administered, or where targeted phthalocyanine gold nanoparticle conjugates are administered and the NIR light is periodically administered during the time the conjugates are administered.

In some embodiments, one or more repetitive cycles are performed including one or more administrations of targeted phthalocyanine gold nanoparticle conjugates and one or more administrations of NIR light. Cycles of administration of targeted phthalocyanine gold nanoparticle conjugates and cycles of administration of NIR light may or may not overlap. In some embodiments, the subject is treated sequentially with the targeted phthalocyanine gold nanoparticle conjugates and the NIR light in repeated iterations. More specifically, the subject may receive an administration of targeted phthalocyanine gold nanoparticle conjugates, then one or more administrations of NIR light, then an administration of targeted phthalocyanine gold nanoparticle conjugates, then a NIR light administration, etc.

In certain embodiments, methods described herein allow for single dose administration of targeted phthalocyanine gold nanoparticle conjugates (e.g., PSMA targeted AuNPs-Pc158 conjugates) followed by multiple sequential NIR light administration targeted to the tumor site of a subject. In some embodiments, NIR light is initially administered between about 6 to about 24 hours after conjugates are administered to the subject. In some embodiments, at least three doses of NIR light are administered following targeted phthalocyanine gold nanoparticle conjugate administration to the subject. In an exemplary embodiment, a first dose of NIR light is administered about 24 hours after the PSMA targeted AuNPs-Pc158 conjugates are administered, and each additional NIR light dose following the first dose of NIR light is administered about 24 hours after the previous administration of NIR light is given.

It has been shown that the quenching effect by the gold can protect the conjugated phthalocyanine compound photosensitizer from premature activation and prolong circulation to maintain a sufficient blood concentration of the conjugates. The sufficient blood concentration of the targeted phthalocyanine gold nanoparticle conjugates when administered to a subject then allow for the administration of multiple NIR light PDT treatments in accordance with a method of treating cancer described herein.

In some embodiments, each successive NIR light administration following a single administration of a photodynamic composition including a plurality of targeted phthalocyanine gold nanoparticle conjugates results in increased targeted phthalocyanine gold nanoparticle conjugates and subsequently phthalocyanine compound accumulation in a subject's tumor. It is believed that following an initial administration of targeted phthalocyanine gold nanoparticle conjugates to a subject, each successive sequential NIR light PDT treatments results in the recruitment of additional conjugates into the tumor site due to the continued breakdown of tumor barriers.

Thus, methods described herein including multiple sequential NIR light administrations following the administration of targeted phthalocyanine gold nanoparticle conjugates can be used to treat tumors having hypoxic regions that will not readily support oxygen reliant PDT with a single NIR light administration. The time interval between multiple sequential NIR light administrations can be a period of time suitable to allow sufficient oxygen resupply in hypoxic tumor regions and additional targeted phthalocyanine gold nanoparticle conjugates to enter the tumor through newly created leaky vasculature or other tumor barrier removal. In additional embodiments, methods described herein including multiple sequential NIR light administrations following the administration of targeted phthalocyanine gold nanoparticle conjugates can be used to treat large tumors (e.g., >500 mm$^3$) in a subject where there may be limited depth penetration of light and/or nanoparticles into the tumor and the sequential PDT can increase targeted phthalocyanine gold nanoparticle conjugates entry into the large tumor, thereby promoting the effectiveness of the method of treatment.

Following the PDT step of a method of treating cancer described herein, the tumor site may be further imaged and/or irradiated after a period of time(s) to detect and ablate residual targeted cancer cells that may have survived a previous single administration or multiple sequential NIR irradiation. This optional step may or may not include additional administration of a photodynamic therapy composition including a plurality of targeted phthalocyanine gold nanoparticle conjugates described herein.

In some embodiments, targeted phthalocyanine gold nanoparticle conjugates described herein can be further conjugated to one or more additional therapeutic agents, such as an anticancer agent. When administered to a subject, the targeted phthalocyanine gold nanoparticle conjugates further including an additional therapeutic agent can target and transiently interact with, bind to, and/or couple with a cancer cell, such as a prostate cancer cell, and once interacting with, bound to, or coupled to the targeted cell advantageously facilitate delivery of the additional therapeutic agent within the cell by, for example, receptor mediated endocytosis. Once delivered to a targeted cell, endosomal conditions can release the additional therapeutic agent, e.g., an anticancer agent such as doxorubicin, where it travels to the nucleus, binds to DNA and exerts anti-proliferative effects. In particular embodiments, one or more additional therapeutic agents can be conjugated to a targeted phthalocyanine gold nanoparticle conjugate described herein to allow for exploitation of the increased conjugate uptake and drug release induced by multiple sequential NIR light administration.

In certain embodiments, the one or more additional therapeutic agents included in a targeted phthalocyanine gold nanoparticle conjugate can include an anticancer agent, such as a chemotherapeutic agent. Examples of anticancer agents that can be directly or indirectly coupled to a targeted phthalocyanine gold nanoparticle conjugates as described herein can include, but are not limited to Taxol, Adriamycin, Dactinomycin, Bleomycin, Vinblastine, Cisplatin, acivicin;

aclarubicin; acodazole hydrochloride; acronine; adozelesin; aldesleukin; altretamine; ambomycin; ametantrone acetate; aminoglutethimide; amsacrine; anastrozole; anthramycin; asparaginase; asperlin; azacitidine; azetepa; azotomycin; batimastat; benzodepa; bicalutamide; bisantrene hydrochloride; bisnafide dimesylate; bizelesin; bleomycin sulfate; brequinar sodium; bropirimine; busulfan; cactinomycin; calusterone; caracemide; carbetimer; carboplatin; carmustine; carubicin hydrochloride; carzelesin; cedefingol; chlorambucil; cirolemycin; cladribine; crisnatol mesylate; cyclophosphamide; cytarabine; dacarbazine; daunorubicin hydrochloride; decitabine; dexormaplatin; dezaguanine; dezaguanine mesylate; diaziquone; doxorubicin; doxorubicin hydrochloride; droloxifene; droloxifene citrate; dromostanolone propionate; duazomycin; edatrexate; eflornithine hydrochloride; elsamitrucin; enloplatin; enpromate; epipropidine; epirubicin hydrochloride; erbulozole; esorubicin hydrochloride; estramustine; estramustine phosphate sodium; etanidazole; etoposide; etoposide phosphate; etoprine; fadrozole hydrochloride; fazarabine; fenretinide; floxuridine; fludarabine phosphate; fluorouracil; fluorocitabine; fosquidone; fostriecin sodium; gemcitabine; gemcitabine hydrochloride; hydroxyurea; idarubicin hydrochloride; ifosfamide; ilmofosine; interleukin II (including recombinant interleukin II, or rIL2), interferon α-2a; interferon α-2b; interferon α-n1; interferon α-n3; interferon β-I a; interferon γ-I b; iproplatin; irinotecan hydrochloride; lanreotide acetate; letrozole; leuprolide acetate; liarozole hydrochloride; lometrexol sodium; lomustine; losoxantrone hydrochloride; masoprocol; maytansine; mechlorethamine hydrochloride; megestrol acetate; melengestrol acetate; melphalan; menogaril; mercaptopurine; methotrexate; methotrexate sodium; metoprine; meturedepa; mitindomide; mitocarcin; mitocromin; mitogillin; mitomalcin; mitomycin; mitosper; mitotane; mitoxantrone hydrochloride; mycophenolic acid; nocodazole; nogalamycin; ormaplatin; oxisuran; pegaspargase; peliomycin; pentamustine; peplomycin sulfate; perfosfamide; pipobroman; piposulfan; piroxantrone hydrochloride; plicamycin; plomestane; porfimer sodium; porfiromycin; prednimustine; procarbazine hydrochloride; puromycin; puromycin hydrochloride; pyrazofurin; riboprine; rogletimide; safingol; safingol hydrochloride; semustine; simtrazene; sparfosate sodium; sparsomycin; spirogermanium hydrochloride; spiromustine; spiroplatin; streptonigrin; streptozocin; sulofenur; talisomycin; tecogalan sodium; tegafur; teloxantrone hydrochloride; temoporfin; teniposide; teroxirone; testolactone; thiamiprine; thioguanine; thiotepa; tiazofurin; tirapazamine; toremifene citrate; trestolone acetate; triciribine phosphate; trimetrexate; trimetrexate glucuronate; triptorelin; tubulozole hydrochloride; uracil mustard; uredepa; vapreotide; verteporfin; vinblastine sulfate; vincristine sulfate; vindesine; vindesine sulfate; vinepidine sulfate; vinglycinate sulfate; vinleurosine sulfate; vinorelbine tartrate; vinrosidine sulfate; vinzolidine sulfate; vorozole; zeniplatin; zinostatin; zorubicin hydrochloride.

Other examples of anticancer agents include, but are not limited to: 20-epi-1,25 dihydroxyvitamin D3; 5-ethynyluracil; abiraterone; aclarubicin; acylfulvene; adecypenol; adozelesin; aldesleukin; ALL-TK antagonists; altretamine; ambamustine; amidox; amifostine; aminolevulinic acid; amrubicin; amsacrine; anagrelide; anastrozole; andrographolide; angiogenesis inhibitors; antagonist D; antagonist G; antarelix; anti-dorsalizing morphogenetic protein-1; antiandrogen, prostatic carcinoma; antiestrogen; antineoplaston; antisense oligonucleotides; aphidicolin glycinate; apoptosis gene modulators; apoptosis regulators; apurinic acid; ara-CDP-DL-PTBA; arginine deaminase; asulacrine; atamestane; atrimustine; axinastatin 1; axinastatin 2; axinastatin 3; azasetron; azatoxin; azatyrosine; baccatin III derivatives; balanol; batimastat; BCR/ABL antagonists; benzochlorins; benzoylstaurosporine; beta lactam derivatives; betaalethine; betaclamycin B; betulinic acid; bFGF inhibitor; bicalutamide; bisantrene; bisaziridinylspermine; bisnafide; bistratene A; bizelesin; breflate; bropirimine; budotitane; buthionine sulfoximine; calcipotriol; calphostin C; camptothecin derivatives; canarypox IL-2; capecitabine; carboxamide-amino-triazole; carboxyamidotriazole; CaRest M3; CARN 700; cartilage derived inhibitor; carzelesin; casein kinase inhibitors (ICOS); castanospermine; cecropin B; cetrorelix; chlorlns; chloroquinoxaline sulfonamide; cicaprost; cis-porphyrin; cladribine; clomifene analogues; clotrimazole; collismycin A; collismycin B; combretastatin A4; combretastatin analogue; conagenin; crambescidin 816; crisnatol; cryptophycin 8; cryptophycin A derivatives; curacin A; cyclopentanthraquinones; cycloplatam; cypemycin; cytarabine ocfosfate; cytolytic factor; cytostatin; dacliximab; decitabine; dehydrodidemnin B; deslorelin; dexamethasone; dexifosfamide; dexrazoxane; dexverapamil; diaziquone; didemnin B; didox; diethylnorspermine; dihydro-5-azacytidine; 9-dioxamycin; diphenyl spiromustine; docosanol; dolasetron; doxifluridine; droloxifene; dronabinol; duocarmycin SA; ebselen; ecomustine; edelfosine; edrecolomab; eflornithine; elemene; emitefur; epirubicin; epristeride; estramustine analogue; estrogen agonists; estrogen antagonists; etanidazole; etoposide phosphate; exemestane; fadrozole; fazarabine; fenretinide; filgrastim; finasteride; flavopiridol; flezelastine; fluasterone; fludarabine; fluorodaunorunicin hydrochloride; forfenimex; formestane; fostriecin; fotemustine; gadolinium texaphyrin; gallium nitrate; galocitabine; ganirelix; gelatinase inhibitors; gemcitabine; glutathione inhibitors; hepsulfam; heregulin; hexamethylene bisacetamide; hypericin; ibandronic acid; idarubicin; idoxifene; idramantone; ilmofosine; ilomastat; imidazoacridones; imiquimod; immunostimulant peptides; insulin-like growth factor-1 receptor inhibitor; interferon agonists; interferons; interleukins; iobenguane; iododoxorubicin; ipomeanol, 4-; iroplact; irsogladine; isobengazole; isohomohalicondrin B; itasetron; jasplakinolide; kahalalide F; lamellarin-N triacetate; lanreotide; leinamycin; lenograstim; lentinan sulfate; leptolstatin; letrozole; leukemia inhibiting factor; leukocyte alpha interferon; leuprolide+estrogen+progesterone; leuprorelin; levamisole; liarozole; linear polyamine analogue; lipophilic disaccharide peptide; lipophilic platinum compounds; lissoclinamide 7; lobaplatin; lombricine; lometrexol; lonidamine; losoxantrone; lovastatin; loxoribine; lurtotecan; lutetium texaphyrin; lysofylline; lytic peptides; maitansine; mannostatin A; marimastat; masoprocol; maspin; matrilysin inhibitors; matrix metalloproteinase inhibitors; menogaril; merbarone; meterelin; methioninase; metoclopramide; MIF inhibitor; mifepristone; miltefosine; mirimostim; mismatched double stranded RNA; mitoguazone; mitolactol; mitomycin analogues; mitonafide; mitotoxin fibroblast growth factor-saporin; mitoxantrone; mofarotene; molgramostim; monoclonal antibody, human chorionic gonadotrophin; monophosphoryl lipid A+myobacterium cell wall sk; mopidamol; multiple drug resistance gene inhibitor; multiple tumor suppressor 1-based therapy; mustard anticancer agent; mycaperoxide B; mycobacterial cell wall extract; myriaporone; N-acetyldinaline; N-substituted benzamides; nafarelin; nagrestip; naloxone+pentazocine; napavin; naphterpin; nartograstim; nedaplatin; nemorubicin; neridronic acid; neutral endopeptidase; nilutamide; nisamycin; nitric oxide modulators;

nitroxide antioxidant; nitrullyn; 06-benzylguanine; octreotide; okicenone; oligonucleotides; onapristone; ondansetron; ondansetron; oracin; oral cytokine inducer; ormaplatin; osaterone; oxaliplatin; oxaunomycin; palauamine; palmitoylrhizoxin; pamidronic acid; panaxytriol; panomifene; parabactin; pazelliptine; pegaspargase; peldesine; pentosan polysulfate sodium; pentostatin; pentrozole; perflubron; perfosfamide; perillyl alcohol; phenazinomycin; phenylacetate; phosphatase inhibitors; picibanil; pilocarpine hydrochloride; pirarubicin; piritrexim; placetin A; placetin B; plasminogen activator inhibitor; platinum complex; platinum compounds; platinum-triamine complex; porfimer sodium; porfiromycin; prednisone; propyl bis-acridone; prostaglandin J2; proteasome inhibitors; protein A-based immune modulator; protein kinase C inhibitor; protein kinase C inhibitors, microalgal; protein tyrosine phosphatase inhibitors; purine nucleoside phosphorylase inhibitors; purpurins; pyrazoloacridine; pyridoxylated hemoglobin polyoxyethylene conjugate; raf antagonists; raltitrexed; ramosetron; ras farnesyl protein transferase inhibitors; ras inhibitors; ras-GAP inhibitor; retelliptine demethylated; rhenium Re 186 etidronate; rhizoxin; ribozymes; RII retinamide; rogletimide; rohitukine; romurtide; roquinimex; rubiginone B1; ruboxyl; safingol; saintopin; SarCNU; sarcophytol A; sargramostim; Sdi 1 mimetics; semustine; senescence derived inhibitor 1; sense oligonucleotides; signal transduction inhibitors; signal transduction modulators; single chain antigen-binding protein; silicon phthalocyanine (PC4) sizofuran; sobuzoxane; sodium borocaptate; sodium phenylacetate; solverol; somatomedin binding protein; sonermin; sparfosic acid; spicamycin D; spiromustine; splenopentin; spongistatin 1; squalamine; stem cell inhibitor; stem-cell division inhibitors; stipiamide; stromelysin inhibitors; sulfinosine; superactive vasoactive intestinal peptide antagonist; suradista; suramin; swainsonine; synthetic glycosaminoglycans (GAGs); tallimustine; tamoxifen methiodide; tauromustine; tazarotene; tecogalan sodium; tegafur; tellurapyrylium; telomerase inhibitors; temoporfin; temozolomide; teniposide; tetrachlorodecaoxide; tetrazomine; thaliblastine; thiocoraline; thrombopoietin; thrombopoietin mimetic; thymalfasin; thymopoietin receptor agonist; thymotrinan; thyroid stimulating hormone; tin ethyl etiopurpurin; tirapazamine; titanocene bichloride; topsentin; toremifene; totipotent stem cell factor; translation inhibitors; tretinoin; triacetyluridine; triciribine; trimetrexate; triptorelin; tropisetron; turosteride; tyrosine kinase inhibitors; tyrphostins; UBC inhibitors; ubenimex; urogenital sinus-derived growth inhibitory factor; urokinase receptor antagonists; vapreotide; variolin B; vector system, erythrocyte gene therapy; velaresol; veramine; verdins; verteporfin; vinorelbine; vinxaltine; vitaxin; vorozole; zanoterone; zeniplatin; zilascorb; and zinostatin stimalamer.

Still other examples of anticancer agents can include the following marketed drugs and drugs in development: Erbulozole (also known as R-55104), Dolastatin 10 (also known as DLS-10 and NSC-376128), Mivobulin isethionate (also known as CI-980), Vincristine, NSC-639829, Discodermolide (also known as NVP-XX-A-296), ABT-751 (Abbott, also known as E-7010), Altorhyrtins (such as Altorhyrtin A and Altorhyrtin C), Spongistatins (such as Spongistatin 1, Spongistatin 2, Spongistatin 3, Spongistatin 4, Spongistatin 5, Spongistatin 6, Spongistatin 7, Spongistatin 8, and Spongistatin 9), Cemadotin hydrochloride (also known as LU-103793 and NSC-D-669356), Epothilones (such as Epothilone A, Epothilone B, Epothilone C (also known as desoxyepothilone A or dEpoA), Epothilone D (also referred to as KOS-862, dEpoB, and desoxyepothilone B), Epothilone E, Epothilone F, Epothilone B N-oxide, Epothilone A N-oxide, 16-aza-epothilone B, 21-aminoepothilone B (also known as BMS-310705), 21-hydroxyepothilone D (also known as Desoxyepothilone F and dEpoF), 26-fluoroepothilone), Auristatin PE (also known as NSC-654663), Soblidotin (also known as TZT-1027), LS-4559-P (Pharmacia, also known as LS-4577), LS-4578 (Pharmacia, also known as LS-477-P), LS-4477 (Pharmacia), LS-4559 (Pharmacia), RPR-112378 (Aventis), Vincristine sulfate, DZ-3358 (Daiichi), FR-182877 (Fujisawa, also known as WS-9885B), GS-164 (Takeda), GS-198 (Takeda), KAR-2 (Hungarian Academy of Sciences), BSF-223651 (BASF, also known as ILX-651 and LU-223651), SAH-49960 (Lilly/Novartis), SDZ-268970 (Lilly/Novartis), AM-97 (Armad/Kyowa Hakko), AM-132 (Arnad), AM-138 (Armad/Kyowa Hakko), IDN-5005 (Indena), Cryptophycin 52 (also known as LY-355703), AC-7739 (Ajinomoto, also known as AVE-8063A and CS-39.HCl), AC-7700 (Ajinomoto, also known as AVE-8062, AVE-8062A, CS-39-L-Ser.HCl, and RPR-258062A), Vitilevuamide, Tubulysin A, Canadensol, Centaureidin (also known as NSC-106969), T-138067 (Tularik, also known as T-67, TL-138067 and TI-138067), COBRA-1 (Parker Hughes Institute, also known as DDE-261 and WHI-261), H10 (Kansas State University), H16 (Kansas State University), Oncocidin A1 (also known as BTO-956 and DIME), DDE-313 (Parker Hughes Institute), Fijianolide B, Laulimalide, SPA-2 (Parker Hughes Institute), SPA-1 (Parker Hughes Institute, also known as SPIKET-P), 3-IAABU (Cytoskeleton/Mt. Sinai School of Medicine, also known as MF-569), Narcosine (also known as NSC-5366), Nascapine, D-24851 (Asta Medica), A-105972 (Abbott), Hemiasterlin, 3-BAABU (Cytoskeleton/Mt. Sinai School of Medicine, also known as MF-191), TMPN (Arizona State University), Vanadocene acetylacetonate, T-138026 (Tularik), Monsatrol, Inanocine (also known as NSC-698666), 3-IAABE (Cytoskeleton/Mt. Sinai School of Medicine), A-204197 (Abbott), T-607 (Tularik, also known as T-900607), RPR-115781 (Aventis), Eleutherobins (such as Desmethyleleutherobin, Desaetyleleutherobin, Isoeleutherobin A, and Z-Eleutherobin), Caribaeoside, Caribaeolin, Halichondrin B, D-64131 (Asta Medica), D-68144 (Asta Medica), Diazonamide A, A-293620 (Abbott), NPI-2350 (Nereus), Taccalonolide A, TUB-245 (Aventis), A-259754 (Abbott), Diozostatin, (–)-Phenylahistin (also known as NSCL-96F037), D-68838 (Asta Medica), D-68836 (Asta Medica), Myoseverin B, D-43411 (Zentaris, also known as D-81862), A-289099 (Abbott), A-318315 (Abbott), HTI-286 (also known as SPA-110, trifluoroacetate salt) (Wyeth), D-82317 (Zentaris), D-82318 (Zentaris), SC-12983 (NCl), Resverastatin phosphate sodium, BPR-OY-007 (National Health Research Institutes), and SSR-250411 (Sanofi).

Other examples of anticancer agents include alkylating agents, such as nitrogen mustards (e.g., mechloroethamine, cyclophosphamide, chlorambucil, melphalan, etc.), ethylenimine and methylmelamines (e.g., hexamethylmelamine, thiotepa), alkyl sulfonates (e.g., busulfan), nitrosoureas (e.g., carmustine, lomusitne, semustine, streptozocin, etc.), or triazenes (decarbazine, etc.), antimetabolites, such as folic acid analog (e.g., methotrexate), or pyrimidine analogs (e.g., fluorouracil, floxouridine, Cytarabine), purine analogs (e.g., mercaptopurine, thioguanine, pentostatin, vinca alkaloids (e.g., vinblastin, vincristine), epipodophyllotoxins (e.g., etoposide, teniposide), platinum coordination complexes (e.g., cisplatin, carboblatin), anthracenedione (e.g., mitoxantrone), substituted urea (e.g., hydroxyurea), methyl hydrazine derivative (e.g., procarbazine), adrenocortical suppressant (e.g., mitotane, amino glutethimide).

The specific process utilized to synthesize the phthalocyanine compounds and phthalocyanines with attached targeted nanoparticles of the present invention, and the use of these new compounds for photodynamic therapy, are more particularly described below in the following examples. The following example is for the purpose of illustration only and is not intended to limit the scope of the claims, which are appended hereto.

Example 1

In this Example, we show PSMA-targeted gold nanoparticles conjugated to PDT agents via a bio-cleavable linker can be used for surgical guidance and to allow for subsequent PDT to eliminate unresectable or "missed" cancer cells because of their ability to effectively deliver drugs, small gold nanoparticles (Au—NP) will serve as the basis for engineering a theranostic nanoparticle designed to contain and deliver Pc4, which is both fluorescent (40% fluorescence yield) and a potent anti-cancer photodynamic therapy (PDT) agent (50% singlet oxygen yield). We have also synthesized a novel high-affinity ligand to prostate specific membrane antigen (PSMA) that can be used to selectively target prostate cancer in vitro and in vivo and have used this ligand to target these nanoparticles to PSMA expressing prostate cancer. We have demonstrated that these nanoparticles can selectively deliver a photodynamic therapy (PDT) drug payload that allows visualization of the cancer cells and enables their destruction when they are irradiated with a specific wavelength of light.

The previous method to load the AuNPs with Pc4 is not ideal to achieve a controllable release and activity. The undesired leakage of Pc4 from AuNPs would reduce the photodynamic therapy efficiency and cause potential damage to healthy cells/tissues. For instance, Pc4 loaded AuNPs with PSMA targeting did also cause a high toxicity to PSMA-negative PC3flu cells upon light irradiation in vitro. Therefore, we modified the AuNP delivery system for phthalocyanine by covalently conjugate phthalocyanine molecules to the surface of AuNPs via a bio-cleavable linker, GFLGC. To achieve a covalent binding, we synthesized a new analogue of Pc4, named Pc158, with an amino group at the end, allowing reaction with the GFLGC linker. The two conjugates reported here were found to be effective as theranostic conjugates, allowing both targeted-bioimaging and targeted-PDT of prostate cancer.

Methods and Materials

All the chemicals were purchased from Sigma-Aldrich unless otherwise stated. Milli-Q water (18.2 MΩ cm) was used in all the experiments.
Synthesis of Silicon Phthalocyanine, Pc158, and GFLGC-Pc158 Conjugations Pc158 was synthesized using a reported method with slight modification. GFLGC-Fmoc (Gly-Phe-Leu-Gly-Cys) was synthesized using standard Fmoc chemistry, and the Cys was protected with pyridinethiol (PDS). Next, GFLGC (PDS)-Fmoc linker was reacted with Pc158 via a typical $NH_2$ and COOH reaction. After reaction, the Fmoc was removed with 20% piperidine DMF solution, and PDS was removed by tris(2-carboxyethyl)phosphine (TCEP). The final product was purified by HPLC and characterized with ESI-MS.
Synthesis of PSMA-Targeted AuNPs-Pc158 Conjugates Gold nanoparticles (AuNPs) with a core diameter of 5 nm were synthesized according to a previous reported method and then PEGylated with $PEG_{5k}$ and $PEG_{5k}$-PSMA-1 at a ratio of 4:1. PSMA-1 ligands were synthesized as previously described, and conjugated to OPSS-$PEG_{5k}$-NHS, deprotected and purified, yielding $PEG_{5k}$-PSMA-1. The AuNPs were purified by centrifuging with 30 kDa cutoff Vivaspin tubes (GE Healthcare). Next, the GFLGC-Pc158 was added to AuNPs at a 40:1 ratio and stirred for 2 days. After 2 days, the NPs were purified again by centrifugation with the same procedure. AuNPs concentration was measured by UV-vis spectroscopy (TECAN, infinite M200), and the Pc158 loading rate was calculated according to the absorbance peak of AuNPs and Pc158. The hydrodynamic size was determined by a dynamic light scattering system (DynaPro Nanostar). The absolute size and polymer shell was visualized by transmission electron microscopy (FEI Tecnai F300 kV) with 2% phosphotungstic acid staining. The stability of AuNPs in serum was examined via gel electrophoresis with AuNPs preincubated with 10% FBS at 37° C. for 30 min. Long-term stability in different mediums was monitored by UV-vis spectroscopy. The ability of AuNPs-Pc158 conjugates to generate ROS upon NIR light illumination was tested by the DPBF assay.
Synthesis of PSMA-Pc413

Silicon phthalocyanine, Pc413, was synthesized as previously reported and conjugated to PMSA-1 ligands via sulfosuccinimidyl-4-(N-maleimidomethyl) cyclohexiane-1-carbocy-late (sulfo-SMCC) linker. Absorbance of PSMA-Pc413 conjugation, free Pc158 and AuNPs-Pc158 before and after light irradiation was measured by UV-vis.
Cathepsin Cleavage and Release of Pc158

The release of Pc158 upon cleavage of the stimuli responsive linker was tested with a toluene-aqueous biphase system, AuNPs-Pc158 conjugates were present in the aqueous phase. An equal volume of toluene was subsequently added in the cuvette, and the organic phase was monitored by UV-vis spectroscopy. Aqueous solutions were prepared by mixing AuNPs-Pc158 conjugates with 1 mL of activated cathepsin B buffer. Cathepsin B (human liver, Athens Research & Technology) was activated by adding 3 μL of enzyme to 6 μL of activation buffer (50 mM sodium acetate, 20 mM DTT, and 1 mM EDTA) and incubated at 37° C. for 15 min and then diluted to 1 mL with diluting buffer (50 mM sodium acetate and 1 mM EDTA). The mixture was stirred gently at 37° C., and the absorbance of the organic phase was measured at 1, 2, 6, 18, and 24 h. AuNPs-Pc158 in the same buffer but without the addition of cathepsin B was used as the control and measured at the same time points.
In vitro Targeting and Intracellular Pc158 Release Retrovirally transformed PSMA-positive PC3pip cells and transfection control PSMA-negative PC3flu cells were incubated for specific uptake and intracellular release studies. Both PC3pip and PC3flu cells were cultured in RPMI1640 medium (Invitrogen Life Technology) with 2 mmol/L L-glutamine, 10% FBS at 37° C., and 5% $CO_2$. PC3pip and PC3flu cells were seeded in μ-Slide 8-Well Chamber Slide (ibidi) at 2000 cells/well. When the cells grew to 70% confluence, AuNPs-Pc158 conjugations were added at a Pc158 concentration of 1 μmol/L and coincubated for 1 h, 6 h, and 24 h. Then the cells were washed with PBS and stained with DAPI, LysoOrange, and MitoGreen (all from abcam) for 30 min at 37° C. and 5% $CO_2$, after which they were washed again with PBS and replete medium added. The release of Pc158 and localization of nuclei, lysosomes, and mitochondria was observed under a Leica HyVolution SP8 confocal microscope (Leica Microsystem Inc.).

In Vitro PDT and ROS Generation in Cells

In vitro PDT was evaluated by CCK8 assay. PC3pip and PC3flu cells were seeded in 96-well plates at $1\times10^4$ cells/well. After 1 day of incubation, AuNPs-Pc158 conjugates were added at Pc158 concentrations of 0.0625, 0.125, 0.25, 0.5, and 1 µmol/L. After coincubation for 6 or 24 h, the medium was removed and cells were washed with PBS, then another 200 µL of medium was added to each well prior to light irradiation. The 96-well plate was irradiated (Appolo Horizon projector, Acco Brands) with radiant exposure at 1 J/cm$^2$, after which the cells were incubated overnight. After incubation, CCK8 agent (DojinDo Laboratories) was added to each well (10 µL/well) and incubated for 3 h at 37° C., and absorbance at 450 nm was measured for each well.

The intracellular ROS generation after light irradiation was evaluated with a DCFH-DA assay. PC3pip and PC3flu cells were cultured in µ-Slide 8-Well Chamber Slide (ibidi) and incubated with AuNPs-Pc158 conjugates for 6 and 24 h at a Pc158 dose of 1 µmol/L. Culture medium was removed, and cells were washed with PBS and incubated with 20 µM DCFH-DA HEPES buffer for 30 min. After incubation, the cells were washed again with PBS and irradiated with light at 1 J/cm$^2$. The cells were counterstained with DAPI and fixed for fluorescence imaging.

In Vivo Tumor Targeting and Intratumor Pc158 Release

All animal procedures were performed according to Institutional Animal Care and Use Committee (JACUA)-approved protocols (2015-0033). Four- to five-week-old male athymic nude mice were subcutaneously implanted with PC3pip or PC3flu cells (100 µL, cells suspended in PBS/matrigel at $1\times10^7$ cells/mL) on the right and left flanks, respectively. When the tumors grew to a sufficient size, AuNPs-Pc158 conjugations were intravenously injected via the tail vein with a Pc158 dose of 0.1 mg/kg. The mice were preimaged before, and at 0.5 h, 1 h, 4 h, 8 h, 24 h, 48 h, 72 h, 96 h, and 120 h after NPs injection using the Maestro In vivo Imaging System (PerkinElmer) to monitor the delivery and release of Pc158. Multispectral images were unmixed into their component spectra (Pc158 autofluorescence and background). Component images were used to quantitatively determine the average Pc158 fluorescence intensity of the PC3pip and PC3flu tumors. Tumor tissues at 24 h postinjection were also collected, cut, and imaged to see the Pc158 distribution (details in the histology analysis section).

CT imaging was also performed to monitor the accumulation of AuNPs in tumors. PC3pip and PC3flu tumor bearing mice were anesthetized under isoflurane and scanned at the same time points by a preclinical Siemens Inveon Positron Emission Tomography-Computed Tomography system (Siemens). CT scanning was carried out at a tube voltage of 70 kV, current of 300 µA, and gantry rotation time of 140 ms. Hounsfield units (HU) were quantified at the tumor areas, and 3D images were reconstructed. The Au contents in tumors, blood, and organs were also measured by ICP-MS as described previously.

In vivo ROS Detection and PDT

The intratumor ROS generation upon light irradiation after AuNPs-Pc158 injection was detected by a ROStar CW800 probe. PC3pip tumor bearing athymic nude mice were injected with AuNPs-Pc158 conjugates at 0.1 mg/kg Pc158 dose and 24 h later, the mice were intravenously injected with ROStar CW800 (100 nmol, LI-COR) via the tail vein. After 30 min, the tumors were subjected to NIR light irradiation at 150 J/cm$^2$ (model 525 Laser Diode Driver, 1-5 mW/cm$^2$ of 672 nm light from a diode laser (Applied Optronics Corp.) equipped with a GRIN-lens-terminated multimode fiber (OZ Optics)). Mice were imaged by Maestro before and after light irradiation. Multispectral images were unmixed into their component spectra (Pc158 autofluorescence and ROStar CW800), and the component images were used to quantitatively determine the average Pc158 and ROStar CW800 fluorescence before and after irradiation of the PC3pip tumor areas. For PDT, PC3pip tumor-bearing mice were injected with AuNPs-Pc158 conjugations at 0.1 mg/kg Pc158 dose. For mice with small tumors (around 100 mm$^3$), PDT was given only once at 24 h post injection, the mice were randomly divided into two groups, one group underwent PDT and the other served as a no-treatment control.

Tumor size and mouse body weight was monitored every other day for a 30 day period. For multiple PDT treatments, mice with tumor size around 500 mm$^3$ were divided into five groups, receiving A) PBS and irradiated three times with light, i.e., PDT; PSMA-targeted AuNPs-Pc158 conjugates and irradiated (B) one time, (C) two times, or (D) three times with light irradiation and (E) PSMA-Pc413 irradiated three times with light. PDT was performed at 24 h, 2 days, and 3 days post-injection. Fluorescence before and after each PDT was monitored with Maestro, and intensity was quantified. One group of mice that received AuNPs-Pc158 were intratumorally injected with cathepsin inhibitor E64 after the first PDT exposure. After PDT, tumor size and mice body weight were monitored over 24 days.

Histology, Detection of AuNPs, and Immunofluorescent Analysis

Following imaging, samples were snap-frozen in optimum cutting temperature compound for cryosectioning (Leica CM3050S). Sections, 10-µm thick, were serially collected directly onto slides and stored at −80° C. for processing. For immune-histochemical analysis, the slides were warmed to room temperature (RT) for 10 min, fixed with 10% buffered formalin, and blocked in blocking buffer (5% normal goat serum/0.3% Triton X-100 in 1xPBS) for 1-h at RT and incubated in primary antibody overnight at +4° C. followed by three 5 min washes in 1xPBS. The presence of apoptosis in the tumor was evaluated by rabbit antihuman of Cleaved Caspase-3 antibody (Cell Signal Tech) at a 1:400 dilution. After washing, the slides were treated with the secondary ready-to-use antibody (goat anti-rabbit polyclonal antibody labeled by Alexa Fluor-594 (Invitrogen, Inc.) for 20 min at RT followed by triple washing with 1xPBS for 5 min. Tissue nuclei were contrasted with Fluoro-Gel-II with DAPI (Electron Microscopy Sciences, Hatfield, PA). Additionally, all adjacent slides were stained for presence of AuNPs (Sigma Silver Enhancer Kit) followed by H&E standard procedures. Fluorescent images were viewed with a Leica-DM4000B microscope (bandpass=560/645, anti-Cleaved Caspase-3) and analyzed with QCapturePro-7 software. An Olympus-VS120/S5 versatile microscope-based scanner was used to generate histological images larger than a single field of view.

Statistical Analysis

All the in vitro experiments and in vivo biodistribution studies were performed in triplicate unless stated otherwise, and for PDT treatment each group had 5 mice. All numerical results are expressed as mean±SD. Descriptive statistics and significant differences between groups were analyzed using two-tailed Student's t tests, and the difference was considered significant if $*p<0.05$ and $**p<0.01$.

Results and Discussion

The design of the theranostic AuNPs, FIG. 1, was developed to result in adequate fluorescence and PDT quenching of light sensitizing agents conjugated via cleavable linkers. Silicon phthalocyanine, Pc158, an analogue of the PDT agent Pc4 that has been utilized in clinical trials, was synthesized and covalently conjugated to polyethylene glycol (PEG) coated AuNPs using a cathepsin-cleavable linker (FIG. 1A).

Subsequently, the particles were decorated with a ligand (PSMA-1) for selective targeting to PSMA receptors expressed on PCa cells. Tight tethering of Pc158 to the AuNP exploited positional quenching, ensuring that Pc158 remains in the quenched ("switched off") state. FIG. 1B summarizes the physical parameters of the conjugates. TEM images reveal a unimodal distribution of nanoparticles without any aggregation and with a PEGylation layer surrounding the particle surface. DLS measurements confirmed a narrow hydrodynamic diameter (HD) distribution (PDI=0.12) for the AuNPs. AuNPs-Pc158 conjugates were resistant to serum absorption benefiting from the PEG corona at their surface as determined by electrophoresis and were stable in physiological solutions (10% FBS and PBS) for over 1 month without any aggregations or undesired Pc158 release.

By covalently binding Pc158 to AuNPs, the Pc158 molecules were completely quenched and inactivated by efficient energy transfer to the AuNPs and could no longer generate reactive oxygen species (ROS) to destroy the singlet oxygen trap, diphenylisobenzofuran (DPBF) upon light irradiation, compared to a nonquenched peptide targeted photo-sensitizer, PSMA-Pc413. Further, light irradiation rapidly bleached the free Pc158 and PSMA-Pc413 but had only a marginal effect on AuNPs-Pc158 conjugates. The photochemical reaction during light irradiation is an irreversible process and the Pc158 molecules undergo a structural change during $^1O_2$ generation depleting fluorescence, which is unrecoverable.

While the AuNP-Pc158 is water-soluble, when liberated, the hydrophobic Pc158 tends toward organic solvent. Using a water-toluene two phase system and activated cathepsin B, rapid and significant release of free Pc158 from AuNP-Pc158 was demonstrated. Without active protease there was no release for up to 24 h. The AuNPs-Pc158 conjugates can reduce premature and nonspecific release of free Pc158 and generation of toxic ROS, but Pc158 can be enzymatically released from AuNPs in the presence of cathepsin B, which is desirable for precision photosensitizer delivery and photodynamic therapy.

Figure 2A:
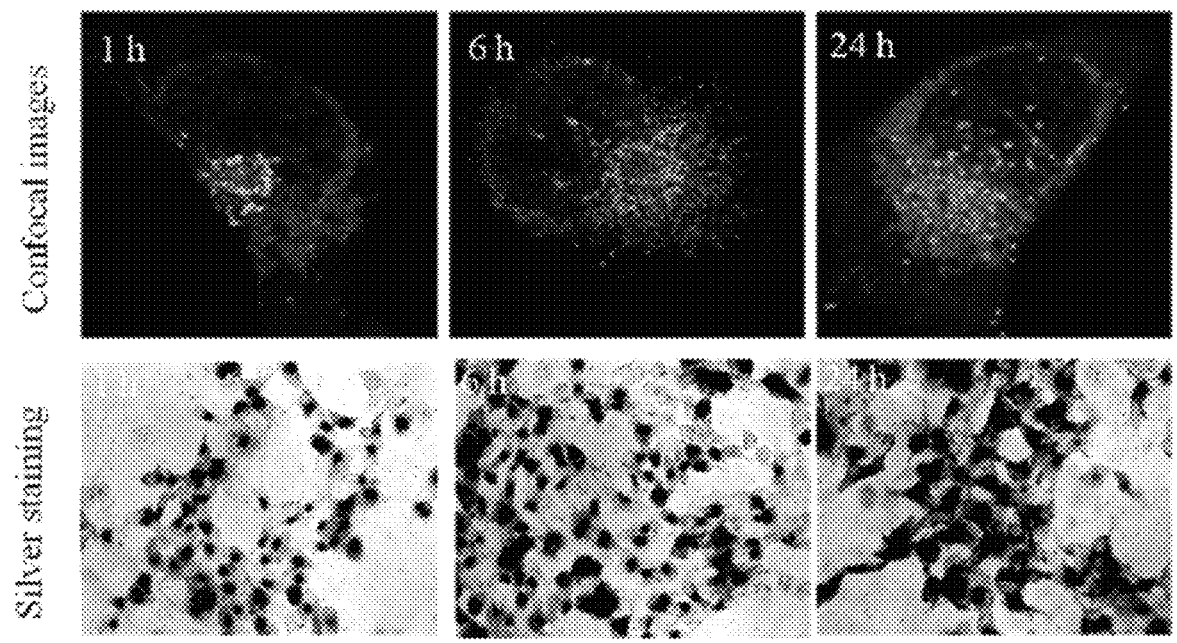
FIGS. 2(A-E) illustrate in vitro cell targeting, intracellular Pc158 release and phototoxicity. (A) Selective uptake and intracellular Pc158 release in PC3pip cells after 1, 6, and 24 h incubation times. Lysosomes (magenta), mitochondria (green), and nuclei (blue) were stained with LysoOrange, MitoGreen, and DAPI, respectively, and Pc158 fluorescence (red) was imaged directly. Overlay of Pc158 and lysosomes (pink) at 6 h indicates cleavage of Pc158 into lysosomes and at 24 h, free Pc158 was released from lysosomes to mitochondria (yellow). Silver staining assay revealed that there was significant AuNPs-Pc158 uptake by PC3pip cells as early as 1 h. (B) Schematic representation of the uptake sequence of AuNP-Pc158 conjugates and intracellular Pc158 release from lysosomes to mitochondria. (C) Confocal images showing intracellular ROS generation after PDT at 6 and 24 h after incubation with AuNPs-Pc158 conjugates. Intracellular ROS (green) was stained with DCFH-DA (transformed into fluorescent $DCF^-$ by ROS) and nuclei were stained with DAPI. (D,E) Phototoxicity shows selective killing of PC3pip cells (PSMA+) over PC3flu cells (PSMA-) at (D) 6 h and (E) 24 h. Data are presented as mean±SD (n=5), and differences between groups are compared with two-tailed t-tests, **$p \leq 0.01$.

Confocal fluorescence microscopy demonstrated that PSMA-targeted AuNPs-Pc158 conjugates could be internalized by PSMA-expressing PC3pip cells but not by PSMA-negative PC3flu cells. Pc158 release and ensuing fluorescence was time-dependent. After 1 h incubation there was significant AuNPs internalization by PC3pip cells while absent in PC3flu cells but intracellular Pc158 fluorescence was still not detectable, FIG. 2A. By 6 h, the Pc158 fluorescent signal was localized to lysosomes in PC3pip cells, preferentially at the perinuclear space, and by 24 h, the signal was distributed around the cell nuclei and overlapping with the mitochondria in PC3pip but not PC3flu cells (FIG. 2A). The colocalization of Pc158 with lysosomes increased from 62% (1 h) to 83% (6 h), indicating increased cleavage of Pc158 in lysosomes, and decreased to 41% at 24 h which can be explained by free Pc158 relocalizing to mitochondria. Whereas, the colocalization percentage of Pc158 with mitochondria increased from 4.5% (1 h) to 23.5% (6 h) and to 54.7% after 24 h. The class of silicon phthalocyanine (Pc) localizes to intracellular membranes, especially mitochondria due to its high affinity for phospholipid cardiolipin (CL), which is located almost exclusively in the inner mitochondrial membrane and at the mitochondrial contact sites. The binding site of Pc in mitochondria is not dependent on the chemical composition of the carriers.

Figure 2B:
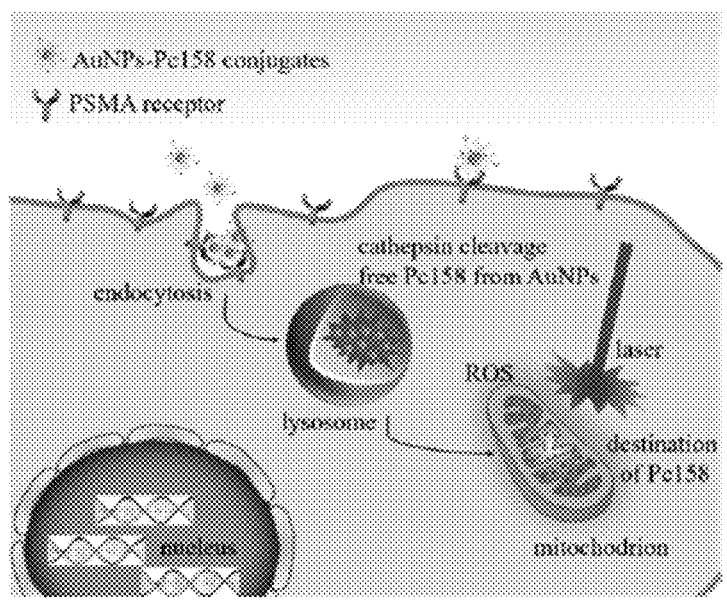

The process of free Pc158 generation could be blocked by adding cathepsin inhibitor E64 to the cells prior to coincubation with AuNPs, similar to non-cleavable covalently bonded AuNP/phthalocyanine conjugates. These data suggest that PSMA-targeted AuNPs-Pc158 enters cells via receptor-mediated endocytosis and localizes in lysosomes, where the GLFGC linker is cleaved, generating free Pc158 that slowly migrates to mitochondria, FIG. 2B. This was dramatically different from previous studies using noncovalently adsorbed Pc4 on AuNPs, which released Pc4 into the cytoplasm and transport to mitochondria occurred within 4 h.

Figure 2C:
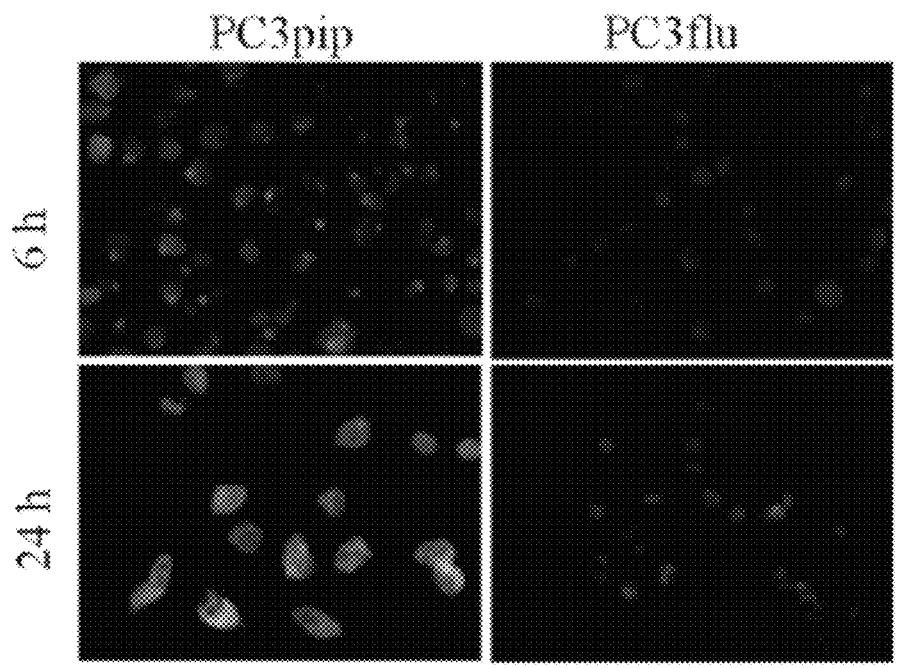
Figure 2D:
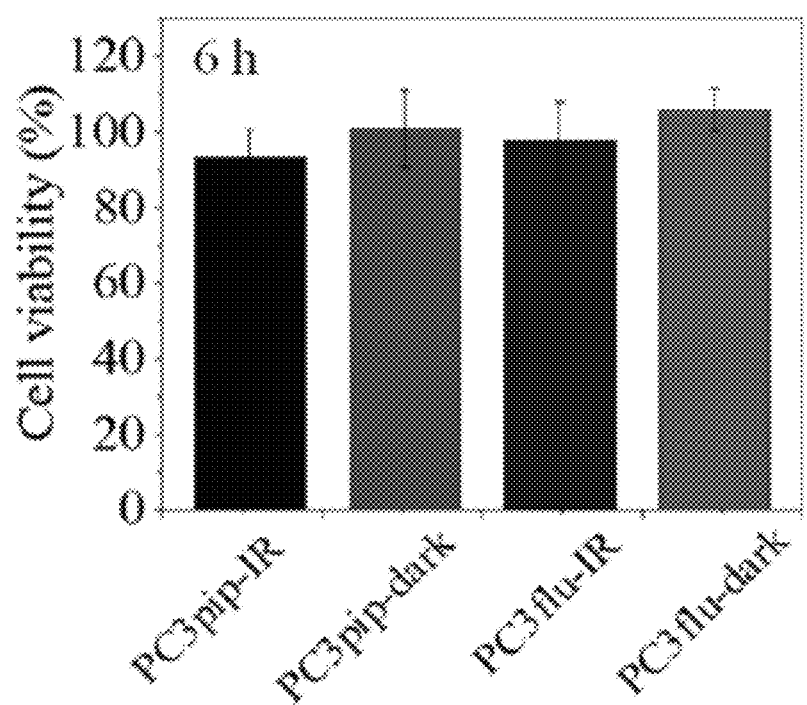
Figure 2E:
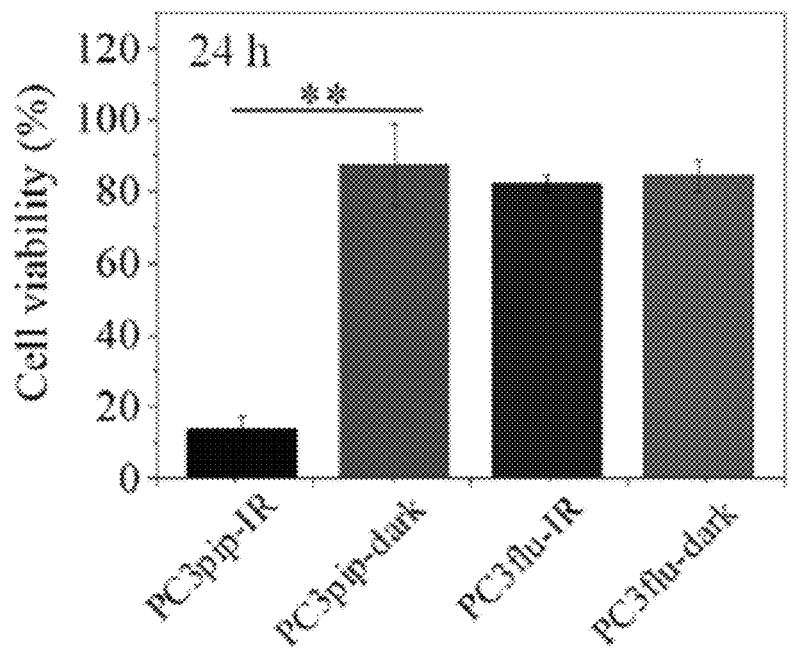
Figure 3A:
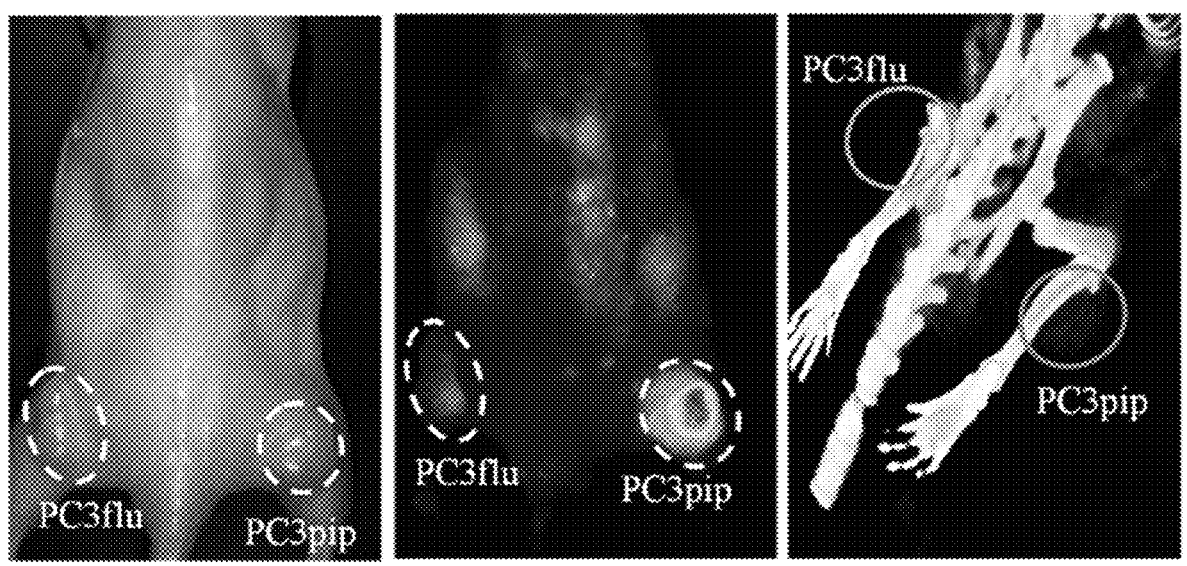
FIGS. 3(A-F) illustrate in vivo tumor targeting of AuNPs-Pc158 conjugates, intratumoral Pc158 release and PDT of 100 $mm^3$ sized tumors. (A) Black and white image showing mouse with both PC3pip (right) and PC3flu (left) tumors, left; Maestro fluorescence image (at 48 h), middle; and 3D CT image (at 8 h) showing good selectivity of AuNPs-Pc158 conjugates, right. (B) Kinetics of Pc158 fluorescence intensity (top panel) and quantitative CT signals (HU) (bottom panel) of PC3pip and PC3flu tumors shows that Pc158 fluorescence peaked at 48 h and Au accumulation peaked at 8 h (n=3). (C) Maestro fluorescence images show intratumoral ROS generation. (D) Quantitative Pc158 and ROS fluorescence intensity before and after PDT (n=3). (E) Representative tumor H&E and immunochemistry images showing the damage by PDT. AuNPs in tumor tissue were stained with silver (red arrows). (F) Photodynamic therapy for small sized tumor (~100 $mm^3$) (n=5). Inset images show the tumor size before PDT (left) and 30 days after PDT (right). Data are presented as mean±SD, and tumor growth inhibition are compared with a two-tailed t-test, **$p \leq 0.01$.
Figure 3B:
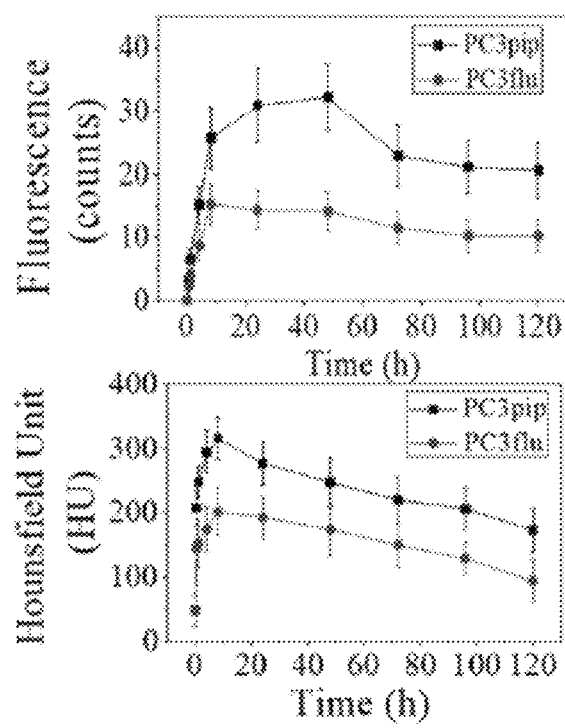

After 6 h incubation, we irradiated the cells and assessed ROS formation using DCFH-DA. A weak DCF fluorescence, indicating ROS production, was detectable only in PC3pip cells and colocalized with Pc158 fluorescence in lysosomes, FIG. 2C. Viability of the cells remained normal suggesting that this low level of Pc158 activation was not sufficient to kill cells (FIG. 2D) and also supported mitochondria localization for efficacy. In contrast, after 24 h irradiation resulted in a strong green DCF-fluorescence visible in all PC3pip cells with much less fluorescence in PC3flu cells (FIG. 2C). PDT at 24 h resulted in concentration-dependent cell killing, with the maximum dose of PSMA-targeted AuNP-Pc158 killing 86.4% of the PC3pip cells and little to no killing of the PC3flu cells (FIG. 2E). Without light excitation Pc158 was nonphototoxic at the same concentration. The highly selective targeting and activation implies that widespread, undesired phototoxicity, and photosensitivity can be avoided. To discriminate between PSMA-receptor-mediated targeting and passive tumor accumulation, i.e., EPR, we subcutaneously implanted both PC3pip and PC3flu tumors in the right and left flanks of nude mice, respectively (FIG. 3A). PC3pip tumors had 3× higher Pc158 fluorescence than PC3flu tumors at 48 h (FIG. 3A, B). The peak fluorescence in the tumor occurred at 48 h. Importantly, fluorescence imaging of the entire mouse suggested that PSMA-targeted AuNP delivery of Pc158 resulted in little off-target release of Pc158 to other parts of the animal. Tumor-associated proteases were critical to release Pc158. When cathepsin-inhibiting E64 was intratumorally injected before AuNPs-Pc158 administration, no Pc158 fluorescence was measurable in the Pc3pip tumors. To see the distribution of Pc158 in tumor, tumor tissue was sectioned and imaged, showing Pc158 fluorescence around the nuclei, which was very similar to the distribution noted in vitro studies (FIG. 2A). This data suggests that the AuNPs-Pc158 penetrated into tumors, was internalized by tumor cells, and released free Pc158 intracellularly.

Figure 3C:
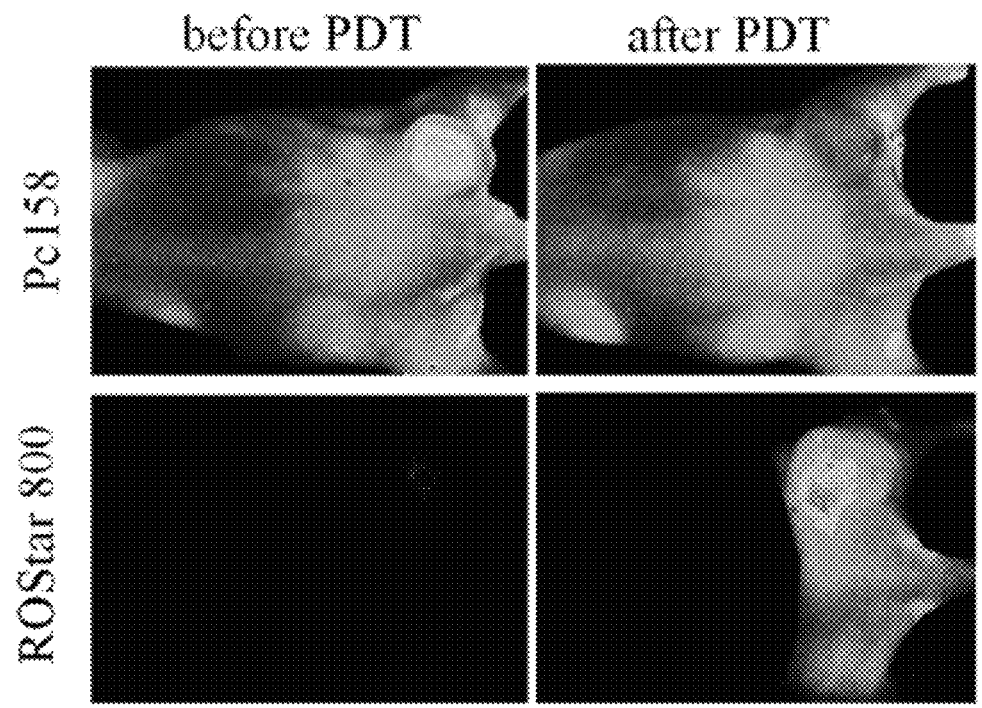
Figure 3D:
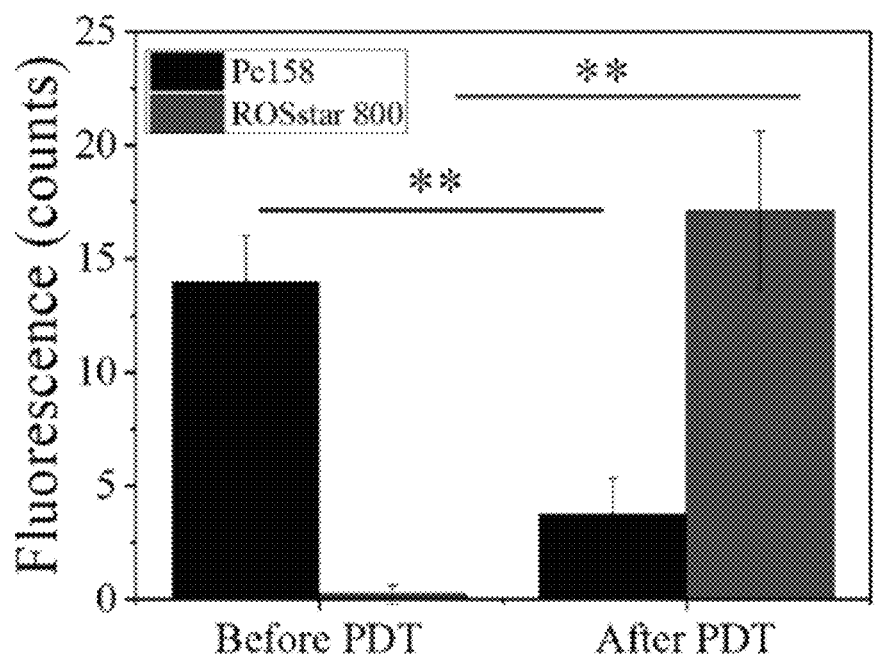
Figure 3E:
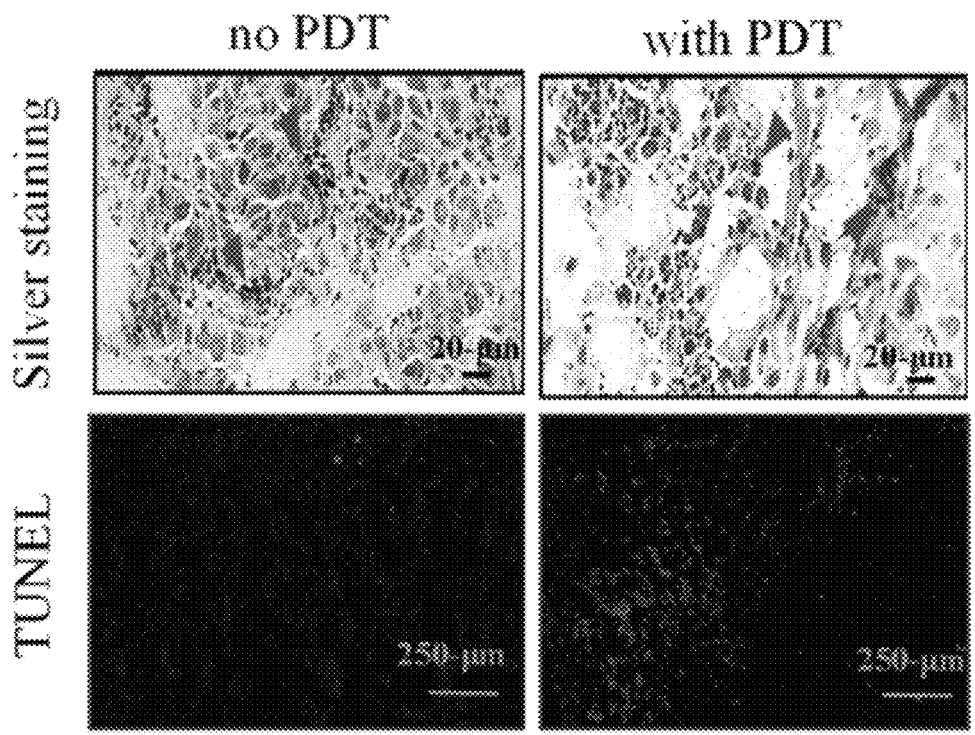

We used micro-CT to monitor AuNP uptake and measured a significantly higher level of AuNP accumulation in PC3pip tumors compared to PC3flu tumors (FIG. 3A, right panel) peaking at 8 h with 315 HU and 201 HU for PC3pip and PC3flu tumors, respectively (FIG. 103B). Interestingly, the peak accumulation for AuNPs is significantly earlier than the peak time for Pc158 fluorescence (48 h), which is in line with AuNP-Pc158 uptake preceding enzymatic release and intracellular migration of Pc158. In contrast, previous studies with noncovalently adsorbed Pc4 to AuNPs showed similar accumulation kinetics for both the AuNP and Pc4 fluorescence in tumors, peaking at 4 h. The targeted AuNPs distribution in organs was also measured using ICP-MS and showed that there was selective uptake into the tumors that remained constant for at least 7 days. Furthermore, both spleen and liver, organs for NP uptake and excretion, also showed increased levels of the AuNP for 7 days. To detect the intratumor ROS generation, we intravenously injected ROStar 800CW, an in vivo ROS probe, 30 min before irradiating the tumor with 150 J/cm$^2$. Baseline fluorescence imaging at 24 h post-injection of PSMA-targeted AuNPs-Pc158 demonstrated strong Pc158 fluorescence from the tumor and absence of ROS signals in the tumor (FIG. 3C). After light irradiation of the tumor, the Pc158 fluorescence was photobleached, indicating activation of Pc158 to produce ROS, and, at the same time, the tumor showed significant ROStar 800CW signal, suggesting generation of ROS in the tumor induced by Pc158 and light irradiation (FIG. 3C). We quantified the fluorescence signals of Pc158 and ROStar 800CW in the tumor before and after light irradiation, showing a significant decrease of Pc158 signal from 14.0 to 3.8 counts and an increase of ROStar 800CW signal from 0.2 to 17.2 counts (FIG. 3D). Since hydrocyanines (ROStar 800CW) are nonfluorescent until being oxidized to fluorescent cyanine dyes by ROS radicals, the fluorescence change gives direct evidence of in vivo ROS generation due to light irradiation. The generated ROS induced direct damage to the tumor tissue as severe necrosis with typical nucleus dissociation, and large amounts of apoptotic lesions (red fluorescent spots) were identified in the H&E and the immunofluorescence images (FIG. 3E). In animals that were administered PSMA-targeted AuNPs-Pc158 but were not irradiated, there was no cell necrosis noticed in the H&E images and very few apoptotic regions, even though a large number of AuNPs clusters were accumulated in the tumor tissue (FIG. 3E, red arrows).

Figure 3F:
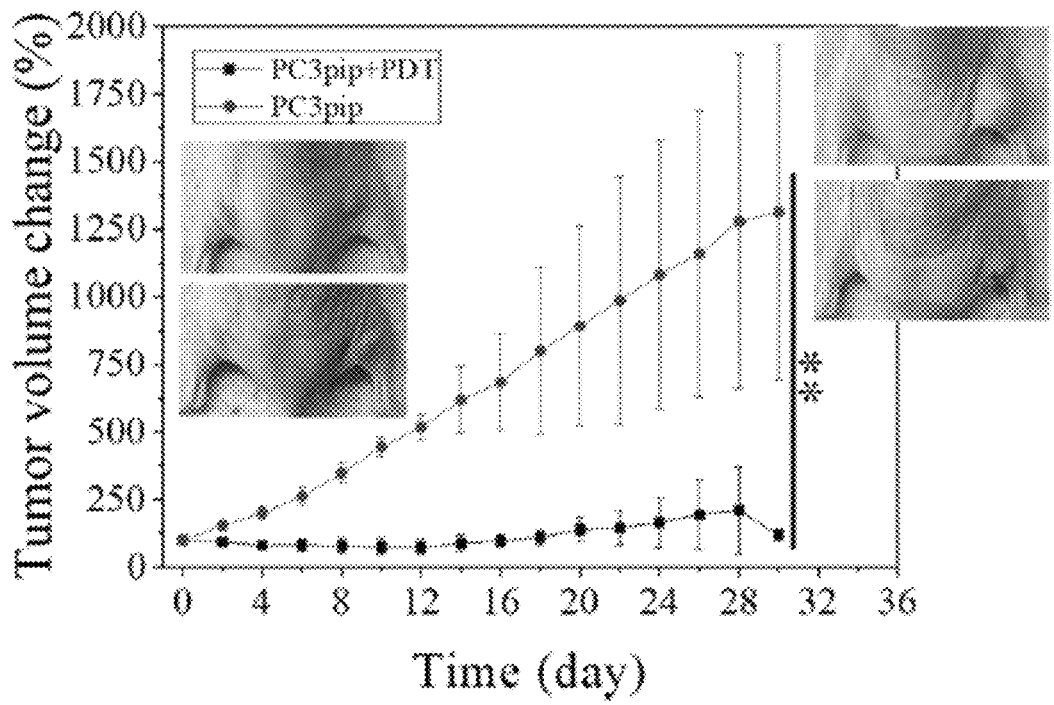

We then tested the efficacy of the targeted PDT agent in vivo. Animals bearing PC3pip tumors (100 mm$^3$) were injected with PSMA-targeted AuNPs-Pc158, subjected to PDT, and tumor growth was monitored over 30 days. PC3pip tumor growth was completely inhibited by PDT treatment (FIG. 3F). In contrast, control tumors grew rapidly in animals that did not undergo PDT, with the tumor size increasing approximately 13 times the original volume in 30 days. No toxicity to the nude mice was noted after PDT, and their body weight was very well maintained over the 30 day period, while it decreased slightly for the mice from the control group without PDT.

Figure 4A:
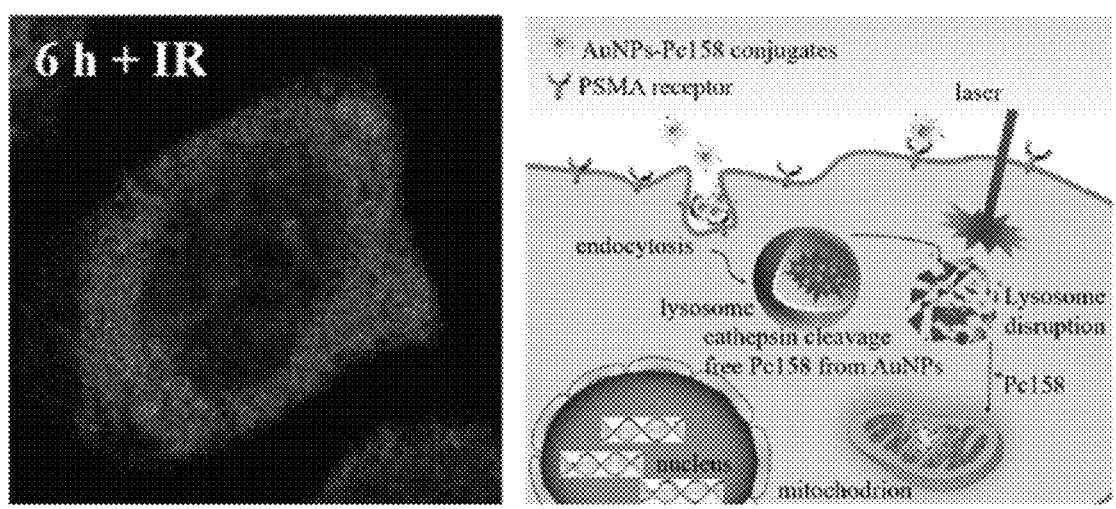
FIGS. 4(A-G) illustrate sequential irradiation induces intracellular Pc158 release and enhances efficacy. (A) Light-induced release of protease liberated Pc158 escaping from lysosomes to mitochondria. Confocal image (left) shows mitochondria containing Pc158, yellow, and free Pc158, red. NIR was irradiated (670 nm, 1 J) at 6 h, and lysosome was disrupted showing no staining compared to FIG. 9A at 6 h with no PDT. Right image diagrams lysosomal release and accumulation into mitochondria after PDT. (B) Phototoxicity of PC3pip cells incubated with AuNPs-Pc158 showing an enhanced PDT efficacy by carrying out a second irradiation 30 min after the first light exposure. (C) Scheme shows the timeline of the repeated PDT treatments in mice with 500 $mm^3$ tumors. (D) Maestro fluorescence images of mice injected with AuNP-Pc158 and PSMA-Pc413 conjugates before and after each PDT treatment (150 $J/cm^2$). (E) Normalized Pc158 fluorescence intensity for mice injected with AuNPs-Pc158 and PSMA-Pc413 before and after each NIR irradiation. (F) In vivo pharmacokinetics of AuNPs in blood over 7 days. (G) AuNP uptake in tumors before and after each PDT showing a PDT enhanced AuNP accumulation in irradiated tumors compared to tumors without PDT. For all studies, data are presented as mean±SD (n=3). Differences of Au content in tumors was compared with a two-tailed t-test, *$p \leq 0.05$, **$p \leq 0.01$.
Figure 4B:
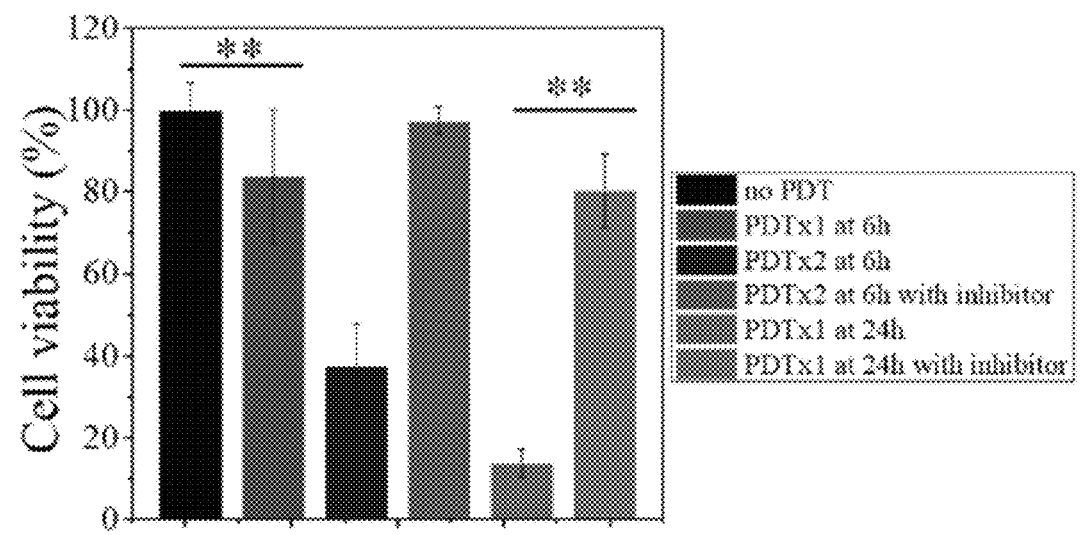

The protease-induced drug release from AuNPs-Pc158 measured at 6 h in vitro in PC3pip cells generated a weak DCF-fluorescence. We therefore surmised that enzymatic release of Pc158 might occur before 24 h when Pc158 fluorescence was visible in cells but remained partially quenched by being encapsulated within the lysosomes. To test this hypothesis, we irradiated the cells at an earlier time point (6 h) in vitro and demonstrated an accelerated escape of liberated Pc158 from lysosomes and rapid accumulation of free Pc158 into mitochondria (FIG. 4A). The kinetics of light triggered Pc158 escape from lysosomes was recorded with the same cells over 30 min. Though only a limited PDT effect was observed at 6 h, it could be enhanced to eradicate 62.4% cells by carrying out a second light irradiation 30 min after the first exposure, taking advantage of accelerated diffusion of free Pc158 from lysosomes to mitochondria. When cathepsin-inhibiting E64 was added to block the cleavage, release of free Pc158 and PDT was significantly hindered (FIG. 4B).

Figure 4C:
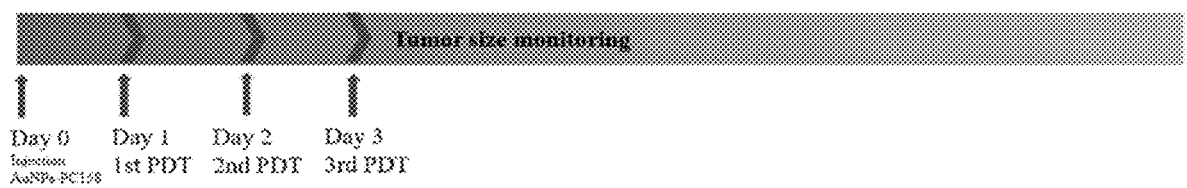
Figure 4D:
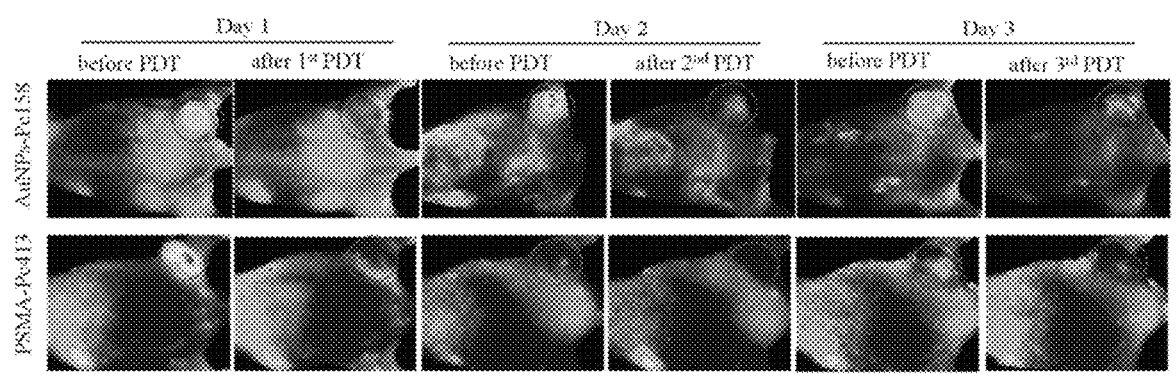
Figure 4E:
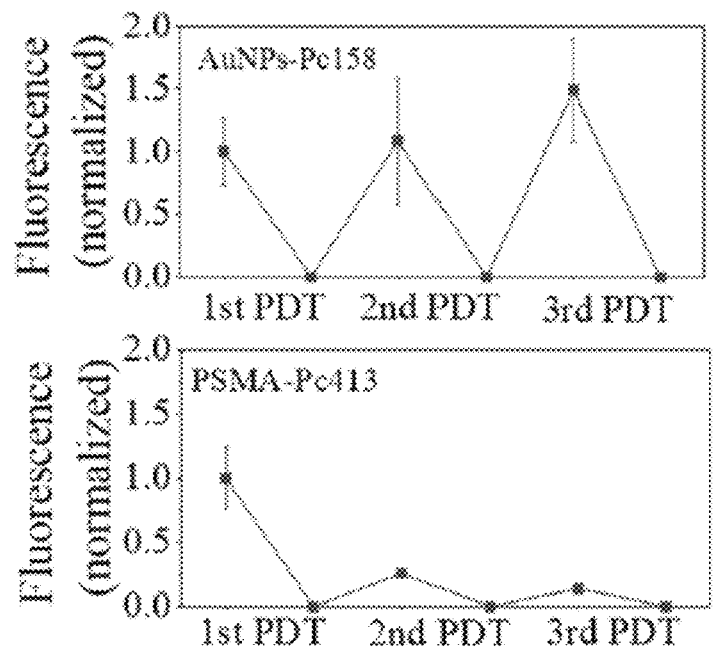

Understanding that sequential PDT could increase the release and efficacy of Pc158, we sought to determine if this approach could be used in the treatment of larger tumors in vivo, which are generally more difficult to achieve complete nanoparticle and light penetration. When the tumors reached approximately 500 mm$^3$, the mice were injected with either PSMA-targeted AuNPs-Pc158 conjugates or PSMA-Pc413, a small molecule PDT agent targeting the PSMA receptor. Mice were then imaged, the distribution measured, and then PDT was performed for both, Pc158 or Pc-413. This was repeated every 24 h for 3 sequential days (FIG. 4C). The choice of the multiple PDT time intervals of 24 h was based on the fluorescence kinetics of Pc158 in vivo, which took up to 24 h to reach the maximum free Pc158 accumulation in tumor. AuNPs-Pc158 conjugates showed good tumor targeting ability and Pc158 was released in the tumor after 24 h. After light irradiation, Pc158 fluorescence in the tumor was bleached. However, it recovered after another 24 h (FIG. 4D). When light irradiation was repeated, the Pc158 fluorescence in the tumor was bleached again. At day 3, a similar Pc158 fluorescence recovery was observed and the mice received another PDT treatment. In contrast, PSMA-Pc413 showed good accumulation in the tumor at 24 h and no Pc413 fluorescence recovery was observed after one light irradiation. We quantified the fluorescence intensity after each treatment for both groups and summarized them in FIG. 4E. For mice injected with AuNPs-Pc158, repeated PDT resulted in an increased tumor-associated Pc158 fluorescence by day 3. However, for the purely molecular PSMA-Pc413, the Pc413 fluorescence was weakened after each light exposure. Since we have demonstrated an irreversible destruction of phthalocyanine molecules by light irradiation, we ascribe the repeated Pc158 fluorescence recovery in tumors to two factors: (1) a sustained Pc158 cleavage/release from AuNPs already within the tumor and (2) PDT enhanced targeted AuNPs-Pc158 accumulation in the tumor.

Figure 4F:
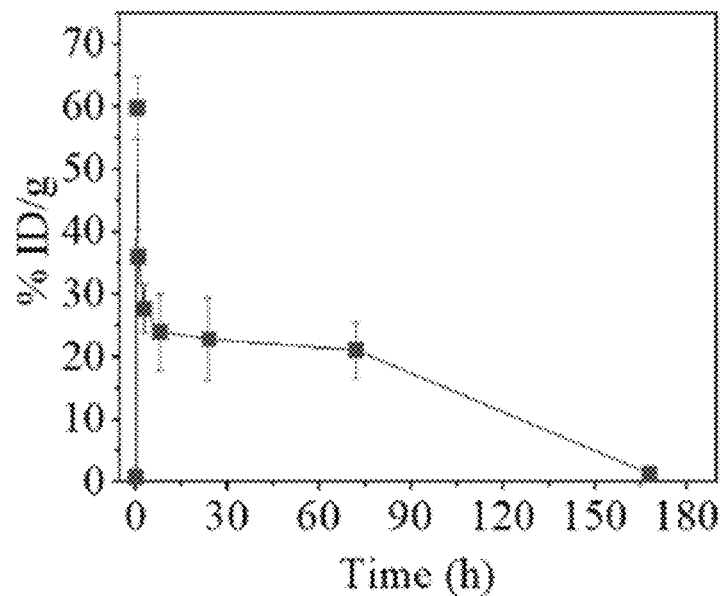
Figure 4G:
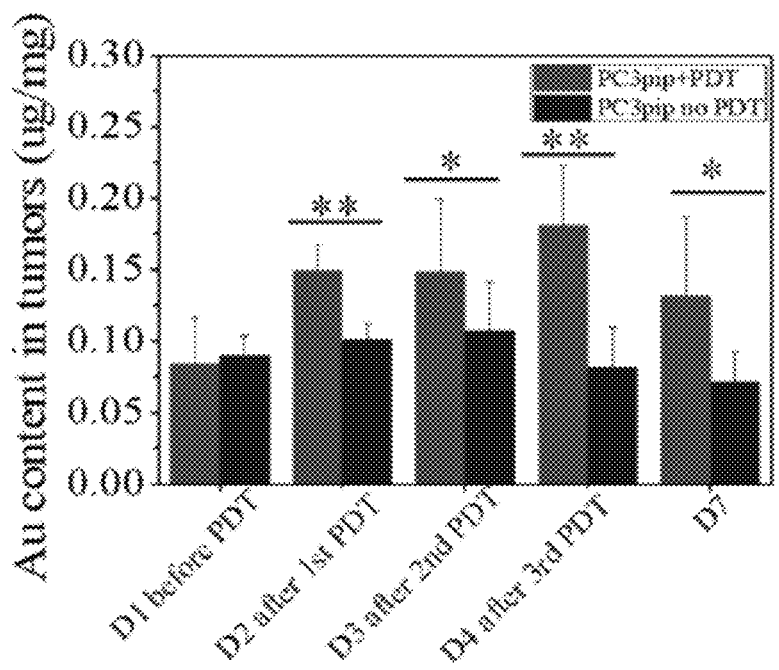

To verify our first notion, we injected PSMA-targeted AuNPs-Pc158 conjugates intravenously and did the same PDT treatment after 24 h (D1), but immediately after bleaching of the Pc158 fluorescence, we intratumorally injected cathepsin-inhibitor E64. The inhibition of protease activity resulted in fluorescence inhibition in the tumor for the following 48 h (at Day 2 and Day 3). Next, we measured the circulation of AuNPs-Pc158 conjugates in blood and found that there was still a 21.0±4.5% ID AuNPs remaining in blood at 72 h postinjection (FIG. 4F). A long circulation time likely allows more targeted AuNPs-Pc158 to accumulate in the tumor via both EPR and active targeting. To demonstrate this possibility, we retrieved the tumors before the first PDT and following each PDT treatment and measured the Au content by ICP-MS (FIG. 11G). Au content in tumors increased after each PDT from 0.08±0.03 µg/mg (before PDT) to 0.18±0.04 µg/mg after the third PDT treatment. In contrast, without any PDT, the Au content in tumors was steady and decreased after 3 days. The increased targeted AuNPs-Pc158 accumulation in tumors is likely due to the PDT-induced damage of the tumor vasculature and permeability enhancement, which is particularly important in larger tumors where deep penetration into the tumor is difficult. To confirm this, we analyzed the blood vessels before and after PDT with CD31 staining, showing significant tumor vasculature damage by PDT. The results above highlight the advantages of targeted AuNPs-Pc158 conjugates over small molecular PDT agents, with an increased and sustained uptake and activatability for precision PDT.

Figure 5A:
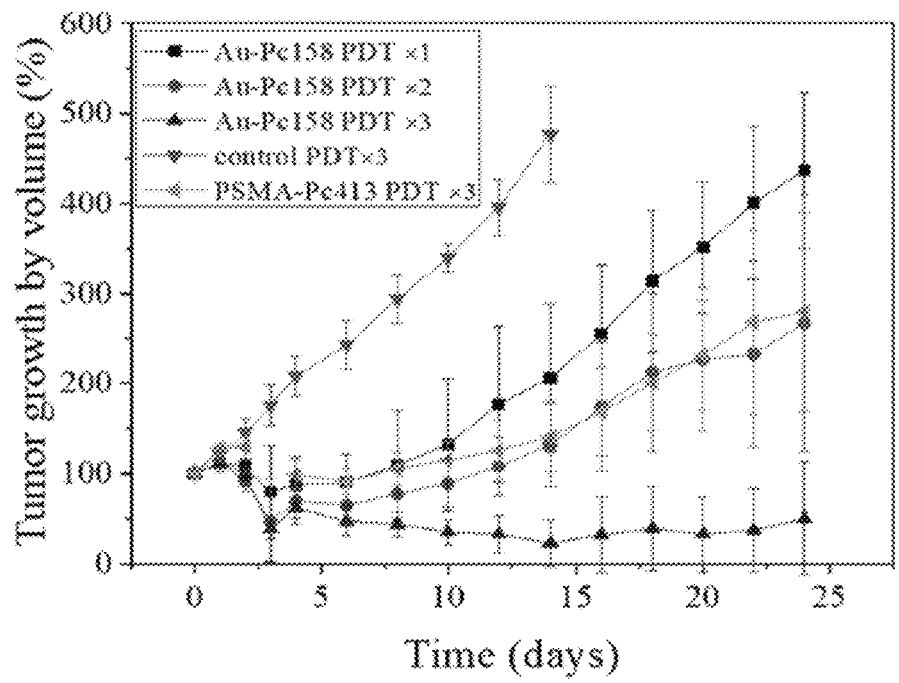
FIGS. 5(A-C) illustrate multiple photodynamic therapy enhances the eradication of large tumors. (A) Effects of PDT on growth kinetics of larger tumors (around 500 $mm^3$). (B) Tumor weight for each of the groups at the end of growth monitoring. Data are presented as mean±SD (n=5), and tumor growth inhibition is compared with two-tailed t-test, **p≤0.01. (C) Tumor H&E and immunochemistry images showing the damage by PDT. Upper panel shows the H&E staining at low magnification; middle panel shows the silver-stained tissue from the highlighted areas (black boxes). The AuNPs were stained black (red arrows); bottom panel shows the immunohistochemistry staining (TUNEL) of tumor tissues taken from the blue box regions demonstrating increase apoptosis with increased iterations of PDT.
Figure 5B:
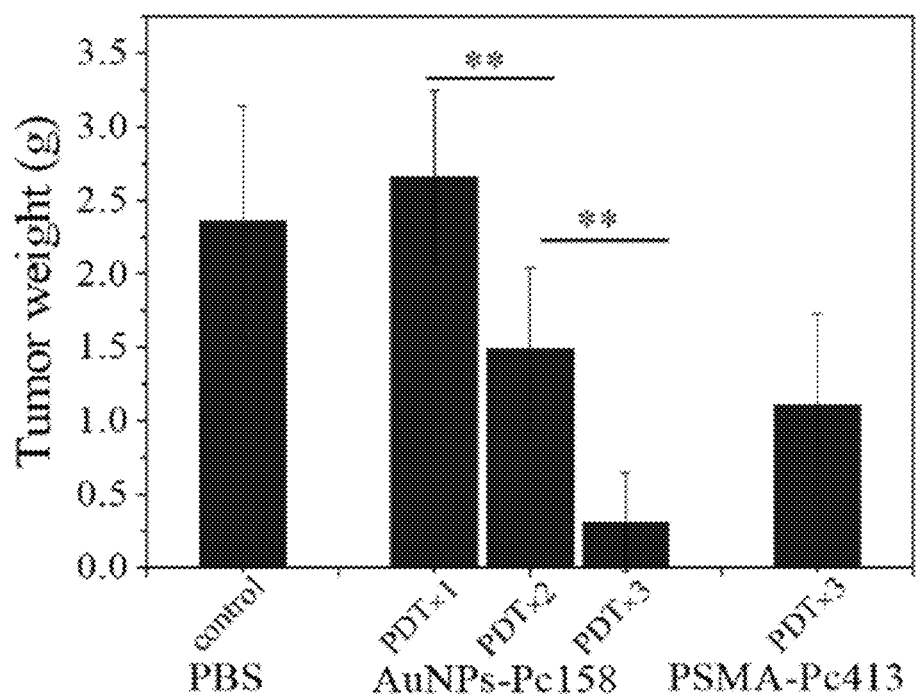

The sequential PDT also improved in vivo efficacy. When PDT was performed after the NP injection, there was a dramatic impact on the tumor growth. For groups that received one or two light irradiations, tumor growth was clearly inhibited in the first 10 days, but then the tumor growth rates of these groups eventually returned to that of the control group. In contrast, mice that were irradiated three consecutive times showed dramatic reductions in tumor size (49.9% of the original volume after 24 days) and maintained almost zero growth rate for the period observed (FIG. 5A). Interestingly, mice injected with PSMA-Pc413 that also received 3 PDT treatments did not show a comparable tumor inhibition, likely due to the limited PDT efficiency for the second and third PDT, i.e., PSMA-1-Pc413 was bleached and its short blood half-life did not allow for regeneration of the molecular PDT reagent within the tumor. Repeated PDT alone did not make any difference on tumor growth. Tumor weight after 24 days also evidenced the significant impact of consecutive PDT treatments on tumor eradication (FIG. 5B). To evaluate the biosafety of such sequential PDT strategies, H&E staining of heart, lung, spleen, liver, and kidney from the three groups of treatments (blank control, AuNPs-Pc158+PDT×3, and PSMA-Pc413+PDT×3) was carried out. We did not observe obvious differences among the three treatment groups, suggesting a good safety profile for both the AuNPs-Pc158 and PSMA-Pc413 after sequential PDT.

Figure 5C:
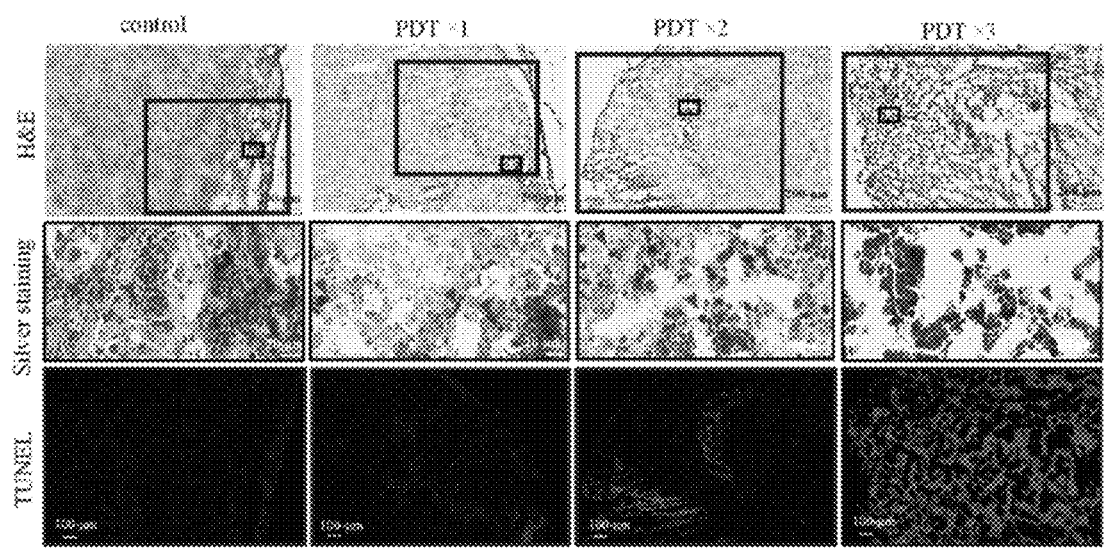

To further compare the damage to the tumors induced by PDT, we retrieved the tumors after each treatment and did histological analysis (FIG. 5C). These data demonstrate that the targeted AuNP-Pc158 conjugates accumulated in the tumor tissues and increased tissue destruction with increasing number of light irradiations. PDT induced nuclei/cytoplasm dissociation and cytoplasm damage that increased with sequential PDT treatments. As silver staining revealed, each additional PDT treatment resulted in more AuNPs accumulating in the tumors (indicated by red arrows), especially when compared to tumors that did not undergo PDT treatments, in agreement with the ICP measurement results in FIG. 11G. Caspase-3 staining (TUNEL assay) also confirmed that sequential PDT treatments induced tumor tissue apoptosis as indicated by the increased red fluorescence after multiple irradiations. For the PSMA-Pc413 treated group, significant tumor tissue damage and apoptosis were also observed.

Here, we combined two biofunctionalities, PSMA targeting and cathepsin-induced drug release for spatiotemporal precise PDT application. In addition, the applied light irradiation further focuses the localization of the PDT drug to the target tumors. Multiple, sequential irradiations led to a gradual increased accumulation of AuNP-Pc158. Altogether we have developed a treatment modality that combined the highest selectivity with sustained targeted sensitizer accumulation and a strongly improved treatment efficacy.

There are potential issues that can restrict the success of nanoparticle delivery of photosensitizers. First, nanoparticles often are unable to fully penetrate tumors to deliver sensitizers deeper into the tumor. Second, NIR light has a limited penetration depth. Third, when tumors reach a larger size, lack of light penetration prevents complete eradication of the tumor cells. Our delivery approach of PDT using photostable AuNPs and sequential irradiation targeted to the tumors allows for single dose drug administration and cumulative destruction of the tumor, potentially solving the aforementioned drug delivery and therapy problems. Histological results verified the increased PDT efficacy for prostate cancer and that AuNPs-Pc158 enabled multiple irradiation of tumors. This approach offers ability to completely and permanently eradicate cancer and can be applied to other tumors such as lung, kidney, colon, stomach, breast, and brain cancers, due to the high expression of PSMA in their neovasculature.

Finally, we anticipate that additionally tethering other drugs with cleavable linkers to the PSMA-targeted AuNP-Pc158 can allow exploitation of increased nanoparticle uptake and drug release induced by sequential light irradiation to more efficiently deliver the traditional anticancer drugs, such as chemotherapy drugs.

From the above description of the invention, those skilled in the art will perceive improvements, changes and modifications. Such improvements, changes and modifications within the skill of the art are intended to be covered by the appended claims. All references, publications, and patents cited in the present application are herein incorporated by reference in their entirety.

Having described the invention, I claim:

1. A photodynamic therapy composition comprising:

a plurality of targeted phthalocyanine gold nanoparticle conjugates, wherein each targeted phthalocyanine gold nanoparticle conjugate includes a plurality of phthalocyanine compounds covalently coupled directly to a surface of a gold nanoparticle via bio-cleavable linkers and a plurality of cancer or tissue targeting agents coupled to the gold nanoparticle, wherein the bio-cleavable linker is a lysosomal cleavable peptide having the amino acid sequence GFLGC (SEQ ID NO:1), and wherein the surface of the gold nanoparticle is directly conjugated to the cysteine residue of the bio-cleavable linker via an Au—S bond.

2. The photodynamic therapy composition of claim 1, wherein the phthalocyanine compound prior to covalent coupling to the surface of the gold nanoparticle has the formula (I):

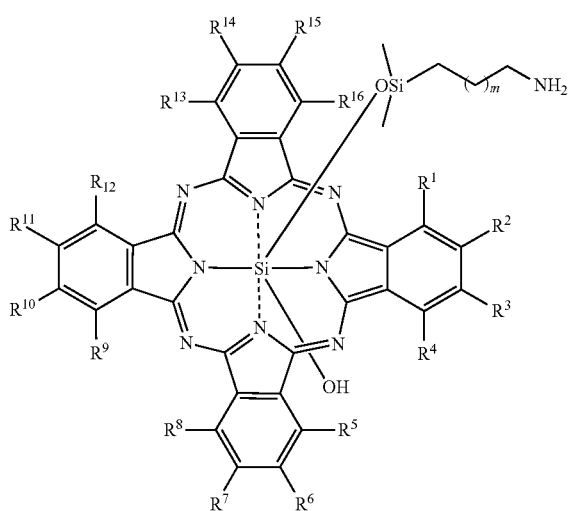

wherein m is 1-5;

$R^1$, $R^4$, $R^5$, $R^8$, $R^9$, $R^{12}$, $R^{13}$, and $R^{16}$ are each independently selected from the group consisting of hydrogen, halogen, nitro, cyano, hydroxyl, thiol, amino, and methyl;

$R^2$, $R^3$, $R^6$, $R^7$, $R^{10}$, $R^{11}$, $R^{14}$, and $R^{15}$ are each independently selected from the group consisting of hydrogen, halogen, nitro, cyano, hydroxyl, thiol, amino, carboxy, aryl, heteroaryl, carbocyclyl, heterocyclyl, $C_{1-6}$ alkyl, $C_{1-6}$ alkenyl, $C_{1-6}$ alkynyl, $C_{1-6}$ alkoxy, $C_{1-6}$ acyl, $C_{1-6}$ alkylcarbonyloxy, $C_{1-6}$ carbocyclylalkyl, $C_{1-6}$ aminoalkyl, $C_{1-6}$ alkylamino, $C_{1-6}$ thioalkyl, $C_{1-6}$alkylthio, $C_{1-6}$hydroxyalkyl, $C_{1-6}$ alkyloxycarbonyl, $C_{1-6}$ alkylaminocarbonyl, and $C_{1-6}$ alkylcarbonylamino; and pharmaceutically acceptable salts thereof.

3. The photodynamic therapy composition of claim 2, wherein $R^1$-$R^{16}$ of the phthalocyanine compound are independently selected from the group consisting of hydrogen, halogen, nitro, cyano, hydroxyl, thiol, amino, and methyl.

4. The photodynamic therapy composition of claim 2, wherein the phthalocyanine compound has the formula (IV):

(IV)

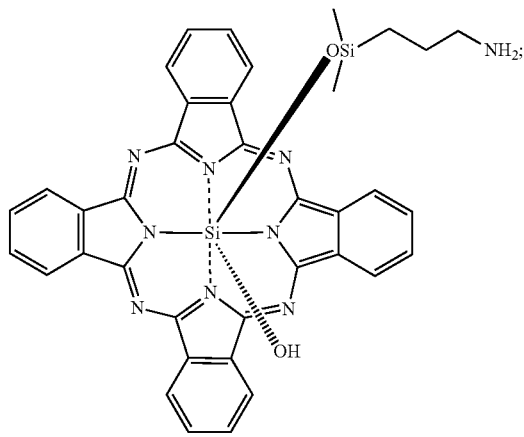

and pharmaceutically acceptable salts thereof.

5. The photodynamic therapy composition of claim 1, wherein the gold nanoparticle is PEGylated and the plurality of cancer or tissue targeting agents coupled to the gold nanoparticle include at least one PSMA ligand coupled to polyethylene glycol of the gold nanoparticle for targeting the composition to a PSMA expressing cancer cell.

6. A method for treating a PSMA expressing cancer in a subject in need thereof, the method comprising:
(a) administering systemically to the subject therapeutically effective amount of a photodynamic therapy composition, the photodynamic therapy composition including a plurality of targeted phthalocyanine gold nanoparticle conjugates, wherein each targeted phthalocyanine gold nanoparticle conjugate includes a plurality of phthalocyanine compounds covalently coupled directly to a surface of a gold nanoparticle via biocleavable linker and a plurality of PSMA ligands coupled to the gold nanoparticle, wherein the biocleavable linker is a lysosomal cleavable peptide having the amino acid sequence GFLGC (SEQ ID NO:1), and wherein the surface of the gold nanoparticle is directly conjugated to the cysteine residue of the biocleavable linker via an Au—S bond; and
(b) exposing the phthalocyanine compounds to near infrared (NIR) light, thereby inducing the cytotoxic effects of the phthalocyanine compound.

7. The method of claim 6, wherein the phthalocyanine compounds are exposed to NIR light after being enzymatically cleaved from the targeted phthalocyanine gold nanoparticle conjugates in an endolysosomal vesicle of a targeted cancer cell, and wherein the conjugated phthalocyanine compounds are inactive prior to cleavage from the targeted gold nanoparticle.

8. The method of claim 6, wherein the photodynamic therapy composition is administered by intravenous injection.

9. The method of claim 6, wherein the PSMA expressing cancer is selected from the group consisting of renal carcinoma, transitional cell carcinoma of the urinary bladder, testicular embryonal carcinoma, colonic adenocarcinoma, neuroendocrine carcinoma, gliobastoma multiforme, malignant melanoma, pancreatic ductal carcinoma, non-small cell lung carcinoma, soft tissue carcinoma, breast carcinoma, and prostatic adenocarcinoma.

10. The method of claim 6, wherein the PSMA expressing cancer is metastatic prostate cancer.

11. The method of claim 6, wherein the step of exposing at least one of the plurality of phthalocyanine compounds to near infrared (NIR) light includes administering to the subject at least one therapeutically effective amount of NIR light following administration of the photodynamic therapy composition to the subject.

12. The method of claim 10, wherein NIR light is administered between about 6 to about 24 hours after the photodynamic therapy composition is administered to the subject.

13. The method of claim 11, wherein NIR light is sequentially administered at least three times following administration of the photodynamic therapy composition to the subject, and wherein each NIR administration results in increased photodynamic therapy composition accumulation in the subject's cancer cells.

14. The method of claim 12, wherein NIR light is first administered between about 6 to about 24 hours after the photodynamic therapy composition is administered to the subject, and one or more subsequent NIR light administrations are administered to the subject about 24 hours after the previous administration.

15. A method for treating a PSMA expressing cancer comprising:

(a) administering systemically to the subject therapeutically effective amount of a photodynamic therapy composition, the photodynamic therapy composition including a plurality of targeted phthalocyanine gold nanoparticle conjugates, wherein each targeted phthalocyanine gold nanoparticle conjugate includes a plurality of phthalocyanine compounds covalently coupled directly to a surface of a gold nanoparticle via biocleavable linker and a plurality of PSMA ligands coupled to the gold nanoparticle, wherein the biocleavable linker is a lysosomal cleavable peptide having the amino acid sequence GFLGC (SEQ ID NO:1), and wherein the surface of the gold nanoparticle is directly conjugated to the cysteine residue of the biocleavable linker via an Au—S bond; and (b) exposing the phthalocyanine compound to near infrared (NIR) light, thereby inducing the cytotoxic effects of the phthalocyanine compound, wherein NIR light is sequentially administered at least three times following administration of the photodynamic therapy composition to the subject, and wherein each NIR administration results in increased photodynamic therapy composition accumulation in the subject's cancer cells.

16. The method of claim 15, wherein NIR light is first administered between about 6 to about 24 hours after the photodynamic therapy composition is administered to the subject, and each subsequent NIR light administration is about 24 hours after the previous administration.

17. The method of claim 15, wherein the phthalocyanine compounds are exposed to NIR light after being enzymatically cleaved from the targeted phthalocyanine gold nanoparticle conjugates in an endolysosomal vesicle of a targeted cancer cell, and wherein the conjugated phthalocyanine compounds are inactive prior to cleavage from the targeted gold nanoparticle.

18. The method of claim 15, wherein the PSMA expressing cancer is metastatic PSMA expressing prostate cancer.

* * * * *